(12) United States Patent
Kitayama et al.

(10) Patent No.: US 7,546,104 B2
(45) Date of Patent: Jun. 9, 2009

(54) RECEIVING APPARATUS AND RECEIVING CIRCUIT

(75) Inventors: Yoshihito Kitayama, Akishima (JP); Kunio Okada, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 599 days.

(21) Appl. No.: 11/293,474

(22) Filed: Dec. 1, 2005

(65) Prior Publication Data

US 2006/0166635 A1 Jul. 27, 2006

(30) Foreign Application Priority Data

Dec. 2, 2004 (JP) ............................ 2004-349968
Jul. 27, 2005 (JP) ............................ 2005-217482

(51) Int. Cl.
*H04B 1/06* (2006.01)
(52) U.S. Cl. ................ 455/277.2; 455/277.1; 455/134; 455/135; 370/334; 370/336
(58) Field of Classification Search ............. 455/272.2, 455/277.1, 134, 135, 277.2; 370/334, 336
See application file for complete search history.

(56) References Cited

U.S. PATENT DOCUMENTS

| | | | |
|---|---|---|---|
| 5,117,505 A | | 5/1992 | Talwar et al. |
| 6,721,550 B1 | | 4/2004 | Okada et al. |
| 7,313,409 B2 | * | 12/2007 | Iacono et al. ............... 455/522 |
| 2005/0018634 A1 | * | 1/2005 | Mantha et al. .............. 370/334 |

FOREIGN PATENT DOCUMENTS

JP 2000-22613 A 1/2000

OTHER PUBLICATIONS

Notification Concerning Transmittal of International Preliminary Report on Patentability and Written Opinion, Chapter I of the Patent Cooperation Treaty for PCT/JP2005/022253, dated Jun. 14, 2007. 8 sheets.

* cited by examiner

*Primary Examiner*—Sanh D Phu
(74) *Attorney, Agent, or Firm*—Frishauf, Holtz, Goodman & Chick, P.C.

(57) ABSTRACT

The invention arranges an auxiliary antenna in the neighborhood of an antenna, and a voltage applied to the auxiliary antenna is changed based on the reception quality of a received signal received by the antenna. Thereby, the reception characteristic of the antenna is changed. Moreover, the optimum antenna is selected among a plurality of arranged antennas based on the reception quality of the received signals received by the plurality of arranged antennas.

24 Claims, 19 Drawing Sheets

RECEIVING APPARATUS AND RECEIVING CIRCUIT

CROSS-REFERENCE TO RELATED APPLICATIONS

This application is based upon and claims the benefit of priority from the prior Japanese Patent Application No. 2004-349968, filed on Dec. 2, 2004, and 2005-217482, filed on Jul. 27, 2005, and the entire contents of which are incorporated herein by reference.

BACKGROUND OF THE INVENTION

1. Field of the Invention

The present invention relates to a receiving apparatus and a receiving circuit which are used for, for example, digital broadcasting and the like.

2. Description of the Prior Art

The orthogonal frequency division multiplexing (OFDM) system has been used as a modulation system of digital broadcasting. The system is a modulation system of transmitting a plurality of electric waves such as an image, a sound and data broadcasting in the state of being multiplexed. Although the OFDM system has been used as a modulation system of the digital terrestrial television broadcasting, research has been made also to the use in mobile communications in recent years.

As a receiving apparatus which receives a signal of digital broadcasting adopting such an OFDM system, a diversity receiving apparatus equipped with a plurality of antennas connected to the diversity receiving apparatus to select a received signal or to synthesize (maximum specific synthesis) received signals according to the received electric field strength of the signal received by each antenna is known.

However, when noises have occurred in the same band as a receiving band in case of the diversity receiving apparatus described above, the received signals which have been received with the antenna and the noise signals are added, and the received electric field strength of the antenna becomes large. Then, a received signal including a noise signal having large received electric field strength is selected, or the received signal is included in the synthesis, and a received signal is thus obtained. As mentioned above, in comparison of the simple received electric field strength by a plurality of antennas, there has been a case where the reception characteristic becomes worse conversely.

Furthermore, as the problems common to the conventional diversity receiving apparatus, because the receiving circuits of the same number as that of the plurality of antennas are needed in addition to the antennas, there are the problems of the increasing cost of the receiving apparatus and the increasing power consumption thereof in addition to the problem of the increasing scale of the receiving apparatus. Then, because such a diversity receiving apparatus is needed to incorporate a plurality of antennas into the receiving apparatus, the miniaturization thereof is difficult and it is not suitable for being built in a cellular phone, a small television for automobile use, and the like.

SUMMARY OF THE INVENTION

Accordingly, the present invention arranges an auxiliary antenna in the neighborhood of an antenna, and changes a voltage applied to the auxiliary antenna based on the reception quality of a received signal received by the antenna, and thereby the invention changes the reception characteristic of the antenna. Moreover, the invention prepares a plurality of antennas, and selects the optimum antenna among the plurality of antennas based on the reception quality of the received signals received by the antennas.

DETAILED DESCRIPTION OF THE PREFERRED EMBODIMENTS

In the following, concrete modes of the present invention are described by using the attached drawings. However, the scope of the invention is not limited to the illustrated examples.

Moreover, as to the embodiments described in the following, a case where a receiving apparatus of the invention is applied to a receiving apparatus for a mobile communication terminal for receiving electric waves of digital broadcasting adopting an OFDM system is described.

First Embodiment

Figure 1:
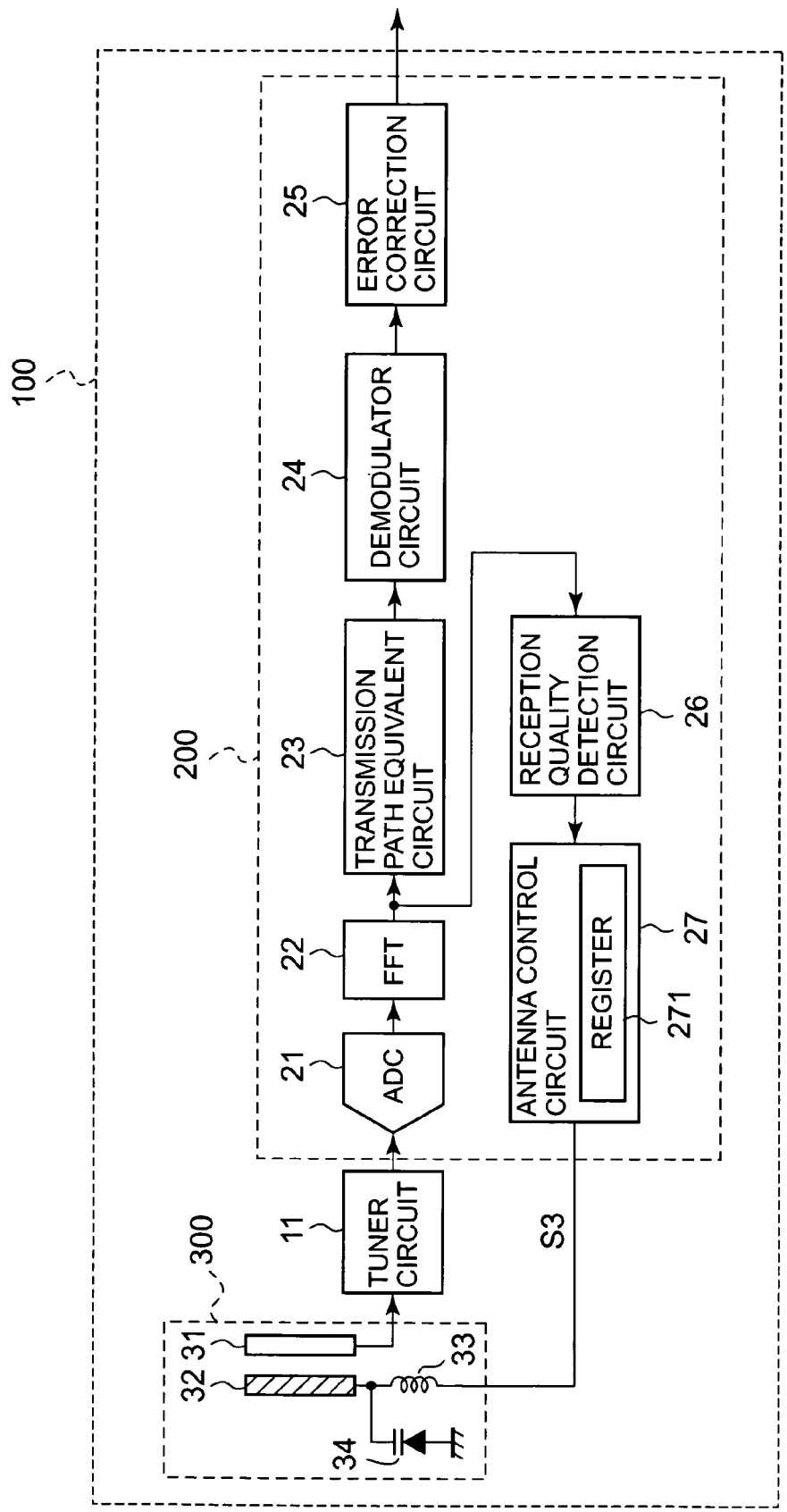
FIG. 1 is a block diagram showing a circuit configuration of a receiving apparatus of a first embodiment.

FIG. 1 is a block diagram of a receiving apparatus 100 receiving the electric waves of digital broadcasting adopting the OFDM system. The receiving apparatus 100 is composed of a variable characteristic antenna unit 300, a tuner circuit 11 and a demodulation unit 200.

The variable characteristic antenna unit 300 is first described. The variable characteristic antenna unit 300 is composed of an antenna 31, an auxiliary antenna 32, an inductor 33 and a varicap 34. The antenna 31 receives an electric wave of digital broadcasting, and converts the received electric wave into an electric signal to output the converted electric signal. An end of the inductor 33 and an end of the varicap 34 are connected to the auxiliary antenna 32. The other end of the inductor 33 is connected to the output terminal of an antenna control circuit 27, which will be described later, and the other end of the varicap 34 is grounded.

The arranged position of the auxiliary antenna 32 to the antenna 31 is set at a position where the antenna 31 can be influenced by an electric field generated around the auxiliary antenna 32 when a voltage is applied to the auxiliary antenna 32. Consequently, when the voltage is applied to the auxiliary antenna 32, the strength of the electric field (electric potential) around the auxiliary antenna 32 is greatly changed, and the reception characteristics of the antenna 31 such as the directivity thereof are influenced. Moreover, the directions of the axes of the antenna 31 and the auxiliary antenna 32 are arranged so that the directions may be parallel to each other. The auxiliary antenna 32 is formed of a conductive material such as a metal.

The tuner circuit 11 receives the input of the electric signal output from the antenna 31, and amplifies the input electric signal to perform tuning of the electric signal to a desired broadcast wave frequency.

The demodulation unit 200 includes an analog to digital converter (ADC) 21, a fast Fourier transform (FFT) 22, a transmission path equivalent circuit 23, a demodulator circuit 24, an error correction circuit 25, a reception quality detection circuit 26 and the antenna control circuit 27.

A signal output from the tuner circuit 11 is converted from an analog signal into a digital signal by the ADC 21, and the Fourier transform processing of the converted digital signal is performed by the FFT 22. The waveform equalization (amplitude equalization and phase equalization) processing of a signal output from the FFT 22 is performed by the transmission path equivalent circuit 23, and the demodulation processing of the equalized signal is performed by the demodulator circuit 24. The error correction processing of a signal output from the demodulator circuit 24 is performed by the error correction circuit 25, and the corrected signal is output to the outside of the receiving apparatus 100 as a transport stream (TS).

Furthermore, a signal output from the FFT 22 is input into the reception quality detection circuit 26, and the value of the reception quality of the signal is calculated. The value of the reception quality is calculated based on the values such as a C/N value and received electric field strength. The antenna control circuit 27 receives the input of the value of the reception quality calculated by the reception quality detection circuit 26, and compares the value of the present reception quality with the value of the last reception quality. Then, the antenna control circuit 27 sets the voltage level of a signal S3 to either a voltage V0 [V] or a voltage V1 [V] based on a comparison result, and outputs the signal S3. The value of the reception quality calculated by the reception quality detection circuit 26 is stored in a register 271, and is used as the value of the last reception quality.

The voltage V0 [V] is a voltage level which does not generate any electric fields (electric potential) around the auxiliary antenna 32 which is so strong as to change the reception characteristic of the antenna 31. The voltage V1 [V] is a voltage level which generates an electric field around the auxiliary antenna 32 so strong as to change the reception characteristic of an antenna 31 greatly. Both the voltage levels are suitably set in design.

Figure 2:
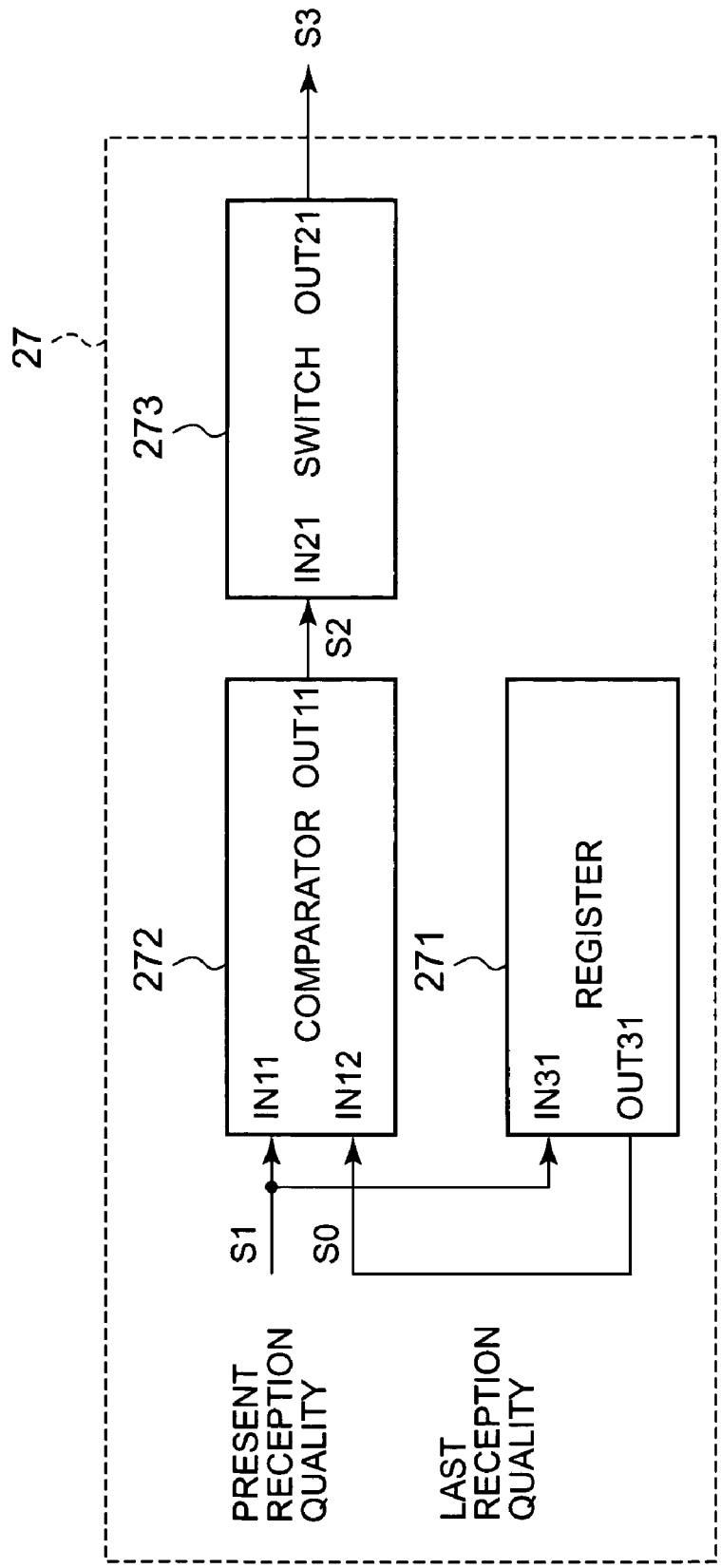
FIG. 2 is a block diagram showing an antenna control circuit of the first embodiment.

FIG. 2 is a block diagram of the antenna control circuit 27. The antenna control circuit 27 is composed of a comparator 272, a switch 273 and the register 271. From the register 271, the value (S0) of the last reception quality is output through a terminal OUT31. Moreover, the value (S1) of the present reception quality is input through a terminal IN31 of the register 271, and the value (S0) of the last reception quality of the register 271 is updated by the value (S1) of the present reception quality to be stored as the value (S0). The value (S1) of the present reception quality is input into a terminal IN11 of the comparator 272, and the value (S0) of the last reception quality stored in the register 271 is input into a terminal IN12. The comparator 272 compares the value (S1) of the present reception quality with the value (S0) of the last reception quality. Then, when the value (S1) of the present reception quality is lower than the value (S0) of the last reception quality, i.e. when the value (S1) has become worse, the comparator 272 outputs a voltage indicating "1" as a signal S2 from a terminal OUT11. On the other hand, when the value (S1) of the present reception quality is equal to or more than the value (S0) of the last reception quality, the comparator 272 outputs a voltage indicating "0" as the signal S2 from the terminal OUT11.

The signal S2 output from the comparator 272 is input into a terminal IN21 of the switch 273. The switch 273 changes the voltage level of the signal S3 according to the signal S2, and outputs the changed signal S3 from a terminal OUT21. The voltage level of the signal S3 at the time of power supply of the receiving apparatus 100 is set to the voltage V0 [V]. After that, when the signal S2 takes the voltage indicating "1", the switch 273 changes the voltage level of the signal S3 from the voltage V0 [V] to the voltage V1 [V], or from the voltage V1 [V] to the voltage V0 [V], and outputs the changed signal S3. On the other hand, when the signal S2 takes the voltage indicating "0", the switch 273 maintains the voltage level of the signal S3. Incidentally, the change of the voltage level of the signal S3 by the switch 273 is performed at a predetermined period in synchronization with a clock signal output from a not shown clock circuit.

The description returns to FIG. 1. The signal S3 output from the antenna control circuit 27 is applied to the auxiliary antenna 32 through the inductor 33. Here, because no strong electric fields are generated around the auxiliary antenna 32 when the voltage applied to the auxiliary antenna 32 is the voltage V0 [V], the antenna 31 receives an electric wave in a first reception characteristic without changing the reception characteristic thereof. On the other hand, because a strong electric field is generated around the auxiliary antenna 32 at the time of the voltage V1 [V], the antenna 31 changes the reception characteristic thereof to a second reception characteristic different from the first reception characteristic, and receives the electric wave.

That is, when the reception quality has worsened, by changing the voltage level of the signal S3, the strength of the electric field (electric potential) generated around the auxiliary antenna 32 is changed. Thereby, the reception characteristic of the antenna 31 is changed. Thus, the reception state of the electric wave is changed. Consequently, the optimum reception quality can be always maintained.

Figure 3:
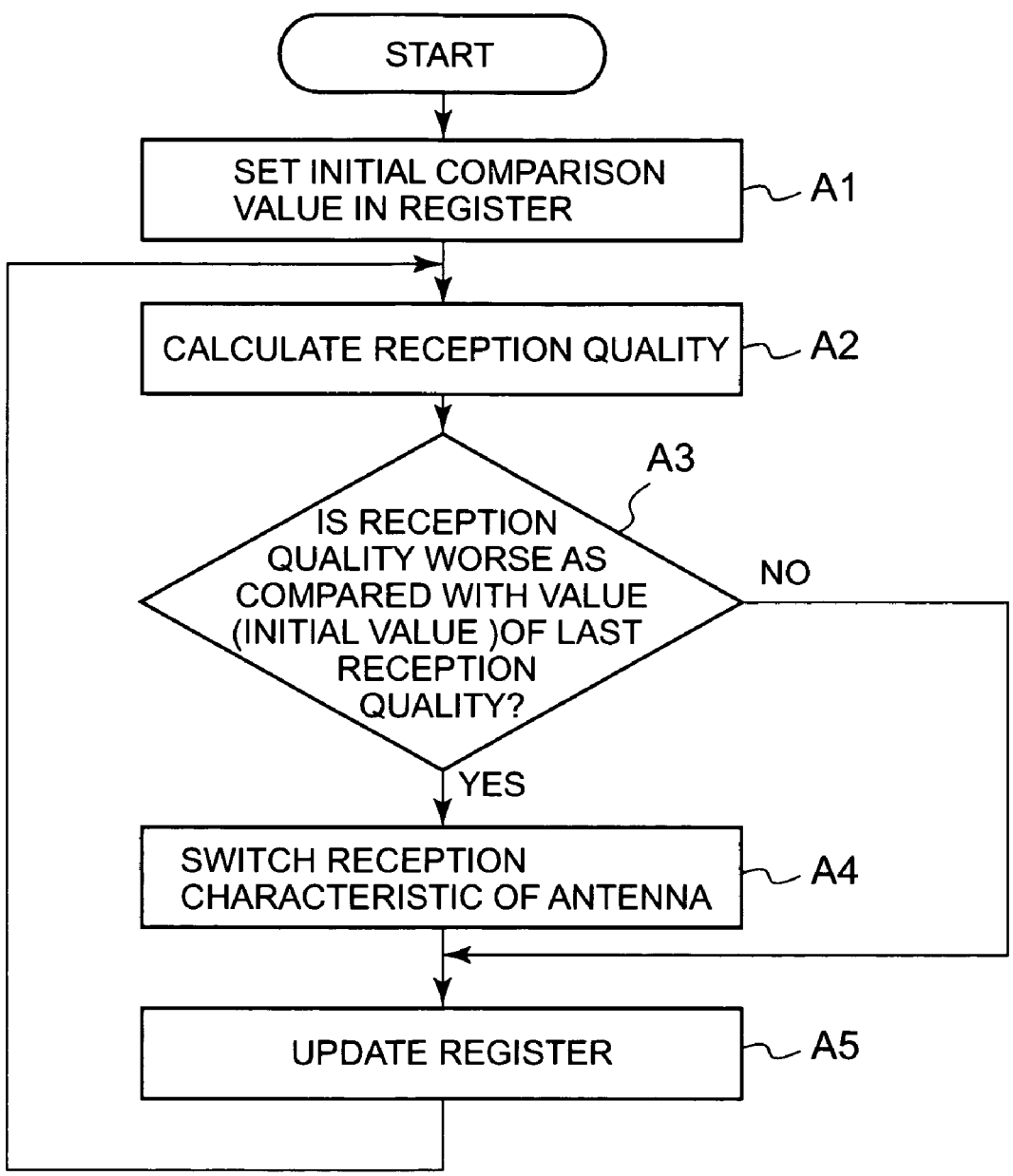
FIG. 3 is a flowchart for illustrating the processing of a reception quality detection circuit and the antenna control circuit of the first embodiment.

FIG. 3 is a flowchart for illustrating the flow of the operations of the reception quality detection circuit 26 and the antenna control circuit 27. First, the antenna control circuit 27 makes the register 271 store the initial value of the comparison value for performing the comparison with the value of the reception quality. The initial value may be a predetermined value, or the value of the present reception quality may be stored in the register 271 as the initial value (Step A1). Then, the reception quality detection circuit 26 calculates the present reception quality (Step A2). The comparator 272 compares the value of the present reception quality with the value of the last reception quality stored in the register 271 (or the initial value). When the value of the present reception quality has become equal to or more than the value of the last reception quality and the reception quality has become better than that of the last time (Step A3; No), the flow of the operations advances to Step A5. On the other hand, when the value of the present reception quality has become less than the value of the last reception quality and the reception quality has become worse than the value of the last reception quality (Step A3; Yes), the comparator 272 outputs the voltage indicating "1" as the signal S2. Thereby, the switch 273 changes the voltage level of the signal S3 from the voltage V0 [V] to the voltage V1 [V], or from the voltage V1 [V] to the voltage V0 [V] (Step A4). Then, the antenna control circuit 27 updates the storage content of the register 271 to the value of the present reception quality (step A5).

Figure 4:
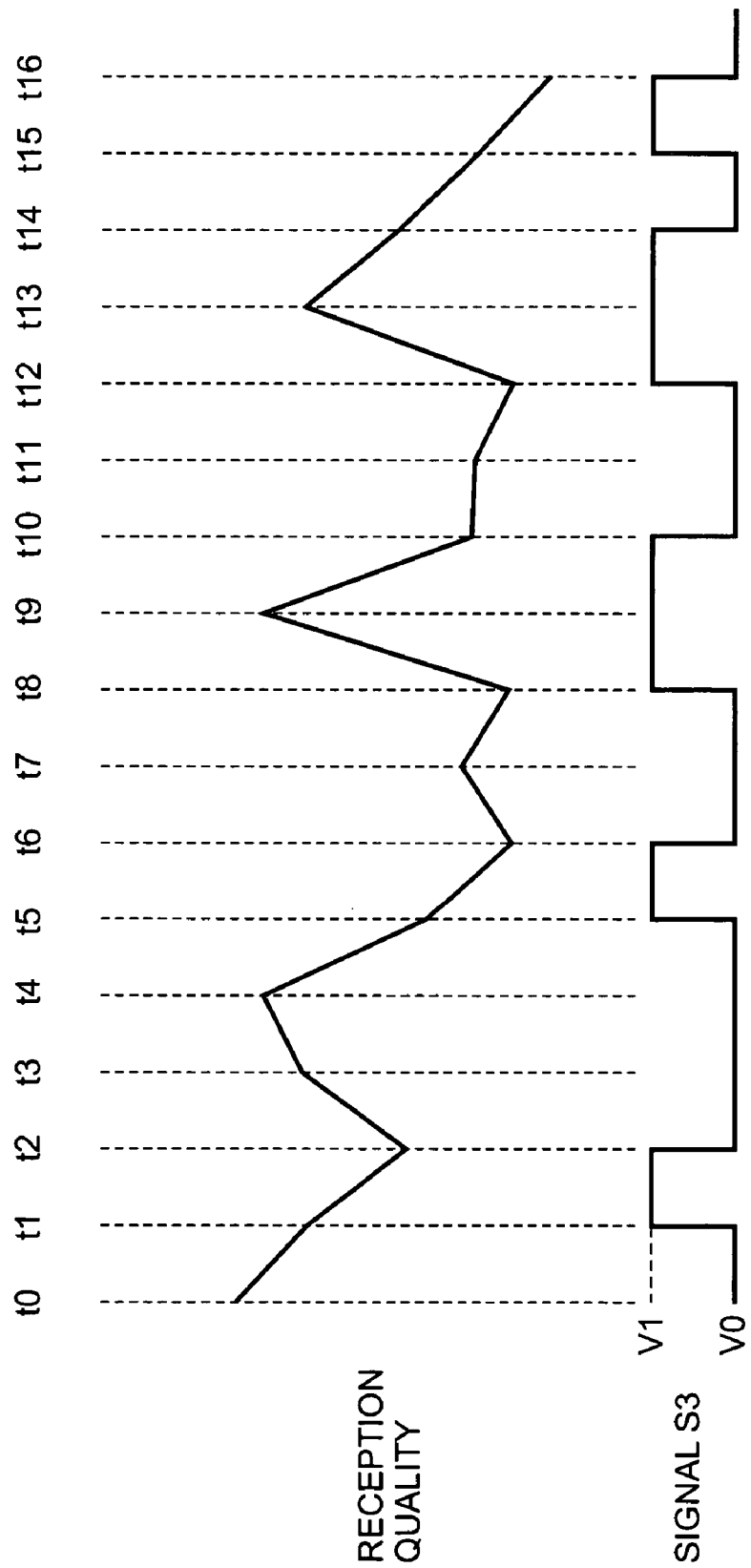
FIG. 4 is a diagram for illustrating the changes of the value of reception quality and a signal S3 of the first embodiment.

FIG. 4 is a graph showing the values of the reception quality output from the reception quality detection circuit 26, and the voltage levels of the signal S3. An ordinate axis denotes the value levels of the reception quality, or the voltage levels of the signal S3. An abscissa axis denotes times. First, the voltage level of the signal S3 takes the voltage V0 [V] at the time of the power supply of the receiving apparatus 100 (time t0). Around the auxiliary antenna 32, almost no electric fields are generated, and the antenna 31 receives an electric wave with the first reception characteristic.

Next, at a time t1, because the value of the reception quality has become worse than the value of the reception quality at the time t0, the comparator 272 outputs the voltage indicating "1" as the signal S2. Thereby, the switch 273 changes the voltage level of the signal S3 from the voltage V0 [V] to the voltage V1 [V]. Because the voltage V1 [V] is applied to the auxiliary antenna 32, a strong electric field is generated around the auxiliary antenna 32, and the antenna 31 receives an electric wave with a second reception characteristic.

Successively, at a time t2, because the value of the reception quality has become worse again from the value of the reception quality at the time t1, the comparator 272 again outputs the voltage indicating "1" as the signal S2. Thereby, the switch 273 changes the voltage level of the signal S3 from the voltage V1 [V] to the voltage V0 [V]. The voltage V0 [V] is applied to the auxiliary antenna 32, and the antenna 31 receives an electric wave with the first reception characteristic. On and after that, such control is repeated.

Figure 5:
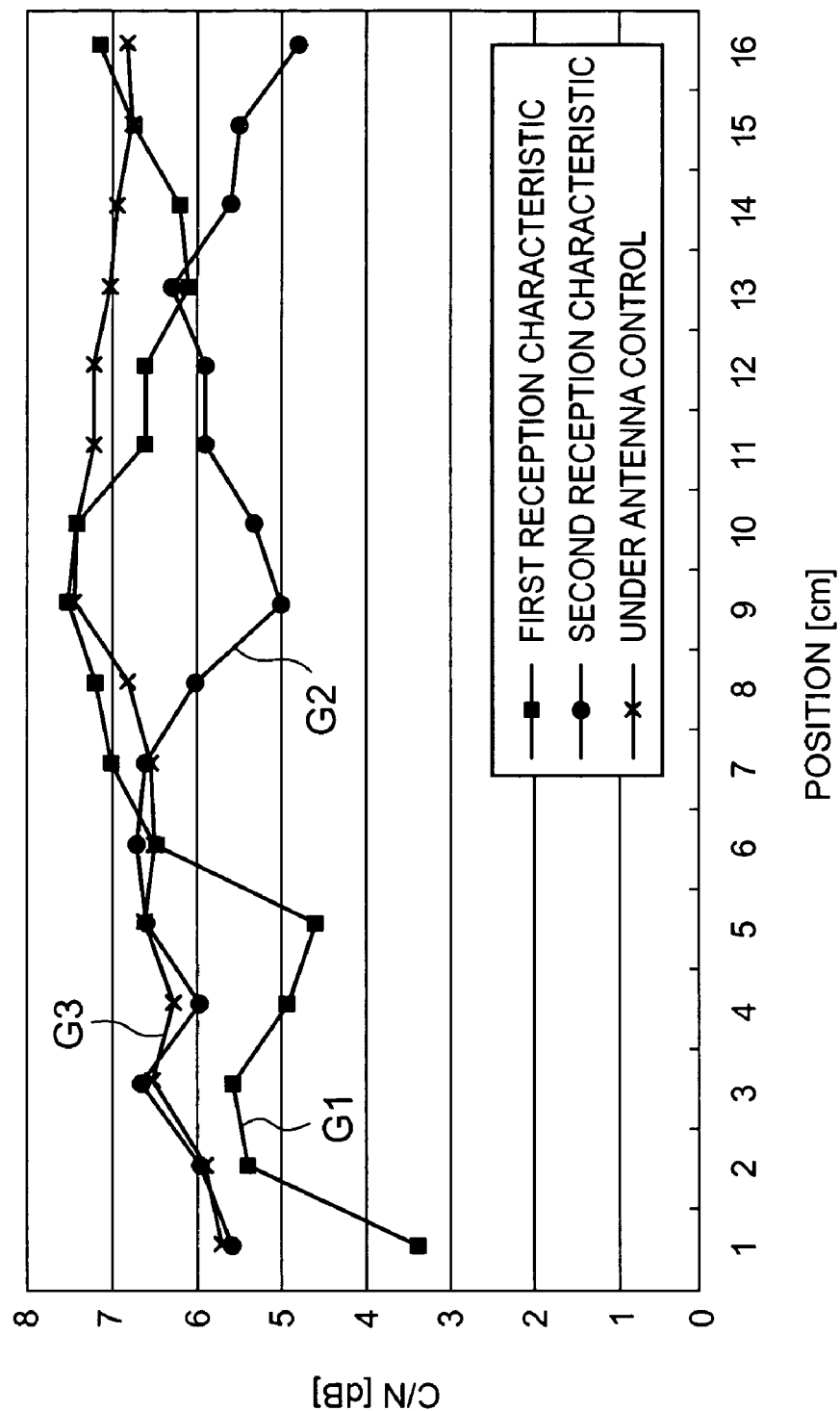
FIG. 5 is a graph showing the changes of the values of the reception quality when the receiving apparatus of the first embodiment is moved.

FIG. 5 is a graph showing the values (C/N values) of the reception quality obtained when the arrangement position of the receiving apparatus 100 was gradually changed in a certain experiment station. The ordinate axis of FIG. 5 indicates C/N values, and the abscissa axis of FIG. 5 indicates distances to which the receiving apparatus 100 was shifted from a predetermined reference position. Because the receiving apparatus 100 of the present embodiment was the receiving apparatus for a mobile communication terminal, the reception situations of electric waves were changed by moving the receiving apparatus 100 from the predetermined position, and the C/N values were measured at those times. In the graph, a line G1 indicates the C/N values when the characteristic of the antenna 31 was set to always be the first reception characteristic. A line G2 indicates the C/N values when the characteristic of the antenna 31 was set to be always the second reception characteristic. A line G3 indicates the C/N values when the changing control of the voltages applied to the auxiliary antenna 32 was performed by the changes of the C/N values.

When the position of the receiving apparatus 100 was changed between the position of 1 [cm] and the position of 6 [cm], the C/N values when the antenna 31 was set to have the second reception characteristic were higher than ones when the antenna 31 was set to have the first reception characteristic. At this time, the C/N values when the changing control of the voltages applied to the auxiliary antenna 32 was performed followed the C/N values when the antenna 31 was set to have the second reception characteristic, which was the better reception quality of both pieces of the reception quality.

Moreover, when the position of the receiving apparatus 100 was changed between the position of 7 [cm] and the position of 12 [cm], the C/N values when the antenna 31 was set to have the first reception characteristic were higher than ones when the antenna 31 is set to have the second reception characteristic. At this time, the C/N values when the changing control of the voltages applied to the auxiliary antenna 32 was performed almost followed the C/N values when the antenna 31 was set to have the first reception characteristic, which was the better reception quality of both pieces of the reception quality. From these facts, it is known that the antenna control circuit 27 changed the voltage applied to the auxiliary antenna 32 to change the reception characteristic of the antenna 31, and that the value of the reception quality was thereby maintained to be in the optimum sate.

As described above, by comparing the value of the last reception quality of a received signal with the value of the present reception quality, and by changing the voltage applied to the auxiliary antenna 32 according to the comparison result, the electric field generated around the auxiliary antenna 32 can be changed, and the reception characteristic of the antenna 31 can be changed. That is, when the value of the reception quality of a received signal has become worse from that of the last reception quality, the voltage applied to the auxiliary antenna 32 is changed to change the reception characteristic of the antenna 31. Thus, the reception state of the electric wave is changed. Consequently, even when noises have occurred in the same band as the receiving band, it is possible to secure the better reception quality than the last reception quality.

Moreover, because the reception characteristic of a single antenna is changed, it is unnecessary to arrange a plurality of antennas in the receiving apparatus to select a received signal having good reception quality or to synthesize the received signals. Consequently, the miniaturization of the receiving apparatus can be achieved.

The control of changing the reception characteristic of the antenna 31 based on a received signal is the so-called feedback control. In the feedback control, for changing the reception characteristic of the antenna 31, the bit error rate calculated at the error correction circuit 25 is not used, but the value of the reception quality of the signal at a previous step (the output signal of the FFT 22) is calculated to change the reception characteristic of the antenna 31. Consequently, the change of the reception characteristic of the antenna 31 can be performed quickly. Thereby, the reception performance of the receiving apparatus 100 can be improved.

Incidentally, it is a matter of course that the bit error rate calculated by the error correction circuit 25 may be used as the value of the reception quality instead of calculating the value of the reception quality (such as the C/N value) from the signal output from the FFT 22 within the range of meeting the requirement of the high-speed performance of the feedback control. In this case, the bit error rate calculated in the error correction circuit 25 is input into the antenna control circuit 27, and the voltage applied to the auxiliary antenna 32 is changed according to the change of the bit error rate.

Moreover, although the antenna control circuit 27 is set to change the signal S3 between the two voltage levels of the voltage V0 [V] and the voltage V1 [V] according to the change of the value of the reception quality and is set to output the signal S3, the voltage level of the signal S3 may be selectively determined among three or more plural voltage levels.

Second Embodiment

In the first embodiment, the description has been given to the case where the present reception quality and the last reception quality of a received signal is compared, and the voltage applied to the auxiliary antenna 32 is changed according to the comparison result. In a second embodiment, descriptions are given to a case where the voltage applied to the auxiliary antenna 32 is changed according to the comparison result of the present reception quality and the last reception quality of a received signal, and the comparison result of the present reception quality and a threshold value of the reception quality. Incidentally, the configuration of the receiving apparatus of the second embodiment is that of the receiving apparatus 100, which has been described in the first embodiment, in which the antenna control circuit 27 is replaced by an antenna control circuit 27a shown in FIG. 6. Accordingly, the descriptions of the same components as those of the first embodiment are omitted, and the descriptions are given only to the antenna control circuit 27a.

Figure 6:
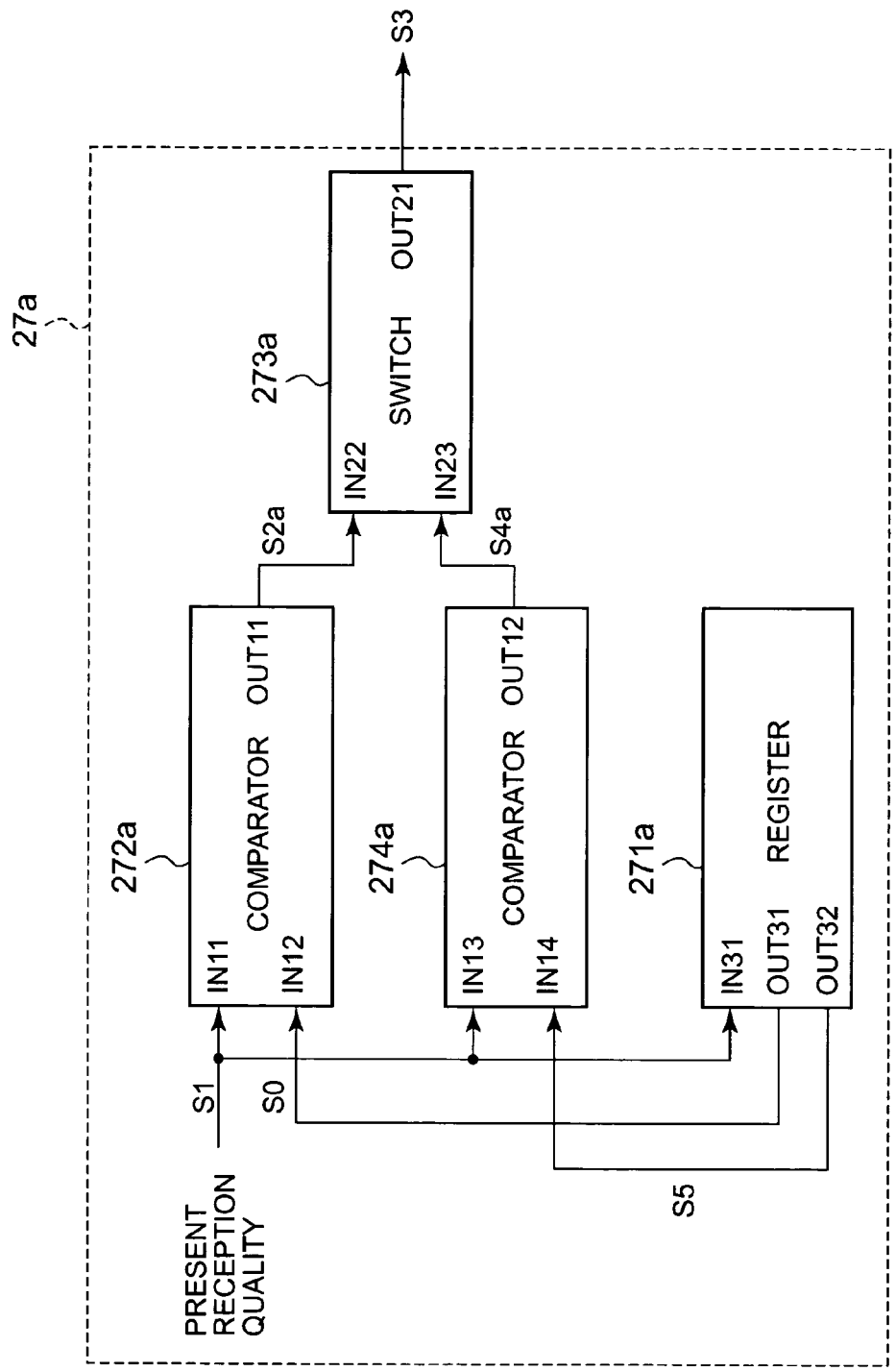
FIG. 6 is a block diagram showing an antenna control circuit of a second embodiment.

FIG. 6 is a block diagram of the antenna control circuit 27a. The antenna control circuit 27a is composed of a comparator 272a, a comparator 274a, a switch 273a and a register 271a. From the register 271a, the value (S0) of the last reception quality is output through the terminal OUT31, and a threshold value (S5) is output through a terminal OUT32. Moreover, the value (S1) of the present reception quality is input through the terminal IN31 of the register 271a, and the value (S1) of the present reception quality is stored in the register 271a as the updated value (S0) of the last reception quality. The value (S1) of the present reception quality is input into the terminal IN11 of the comparator 272a, and the value (S0) of the last reception quality stored in the register 271a is input into the terminal IN12. The value (S1) of the present reception quality is input into a terminal IN13 of the comparator 274a, and the threshold value (S5) of the reception quality (hereinafter simply referred to as a "threshold value") stored in the register 271a is input into a terminal IN14. The threshold value (S5) is a value set in the register 271a in advance as a value of the reception quality which is desired to be maintained even in the worst case.

The comparator 272a compares the value (S1) of the present reception quality with the value (S0) of the last reception quality. When the value (S1) of the present reception quality has fallen from the value (S0) of the last reception quality and the reception quality has become worse than the last reception quality, the comparator 272a outputs the voltage indicating "1" as a signal S2a from the terminal OUT11. On the other hand, when the value (S1) of the present reception quality is the same value as the value (S0) of the last reception quality, or has become higher than the value (S0) of the last reception quality, and the reception quality has become better than the last reception quality, the comparator 272a outputs the voltage indicating "0" as the signal S2a from the terminal OUT11.

The comparator 274a compares the value (S1) of the present reception quality with the threshold value (S5). When the value (S1) of the present reception quality is lower (worse) than the threshold value (S5), the comparator 274a outputs the voltage indicating "1" as a signal S4a from a terminal OUT12. On the other hand, when the value (S1) of the present reception quality is the same value as the threshold value (S5), or has become higher (better) than the threshold value (S5), the comparator 274a outputs the voltage indicating "0" as the signal S4a from the terminal OUT12.

The signal S2a output from the comparator 272a is input into a terminal IN22 of the switch 273a, and the signal S4a output from the comparator 274a is input into a terminal IN23. The switch 273a changes the voltage level of the signal S3 according to the signals S2a and S4a, and outputs the signal S3 through a terminal OUT22. It is supposed that the voltage level of the signal S3 at the time of power supply to the receiving apparatus 100 is the voltage V0 [V] After that, when the signal S2a takes the voltage indicating "1" and the signal S4a takes the voltage indicating "1", the switch 273a changes the voltage level of the signal S3 from the voltage V0 [V] to the voltage V1 [V], or from the voltage V1 [V] to the voltage V0 [V], and outputs the changed signal S3. On the other hand, when the signal S2a takes the voltage indicating "0" and the signal S4a takes the voltage indicating "1", or when the signal S2a takes the voltage indicating "1" and the signal S4a takes the voltage indicating "0", or when the signal S2a takes the voltage indicating "0" and the signal S4a takes the voltage indicating "0", the switch 273a maintains the voltage level of the signal S3. Incidentally, the judgment of whether the switch 273a changes the voltage level of the signal S3 or not is performed in a predetermined period in synchronization with a clock signal output from a not shown clock circuit.

That is, when the value (S1) of the present reception quality is lower (worse) than the value (S0) of the last reception quality, and when the value (S1) of the present reception quality is lower than the threshold value (S5), the switch 273a changes the voltage level of the signal S3. On the other hand, when the value (S1) of the present reception quality is lower (worse) than the threshold value (S5) but is equal to or more than the value (S0) of the last reception quality, or when the value (S1) of the present reception quality is equal to or more than the threshold value (S5) independent of the comparison result of the value (S1) of the present reception quality with the value (S0) of the last reception quality, the switch 273a does not change the voltage level of the signal S3, and maintains the voltage level.

Figure 7:
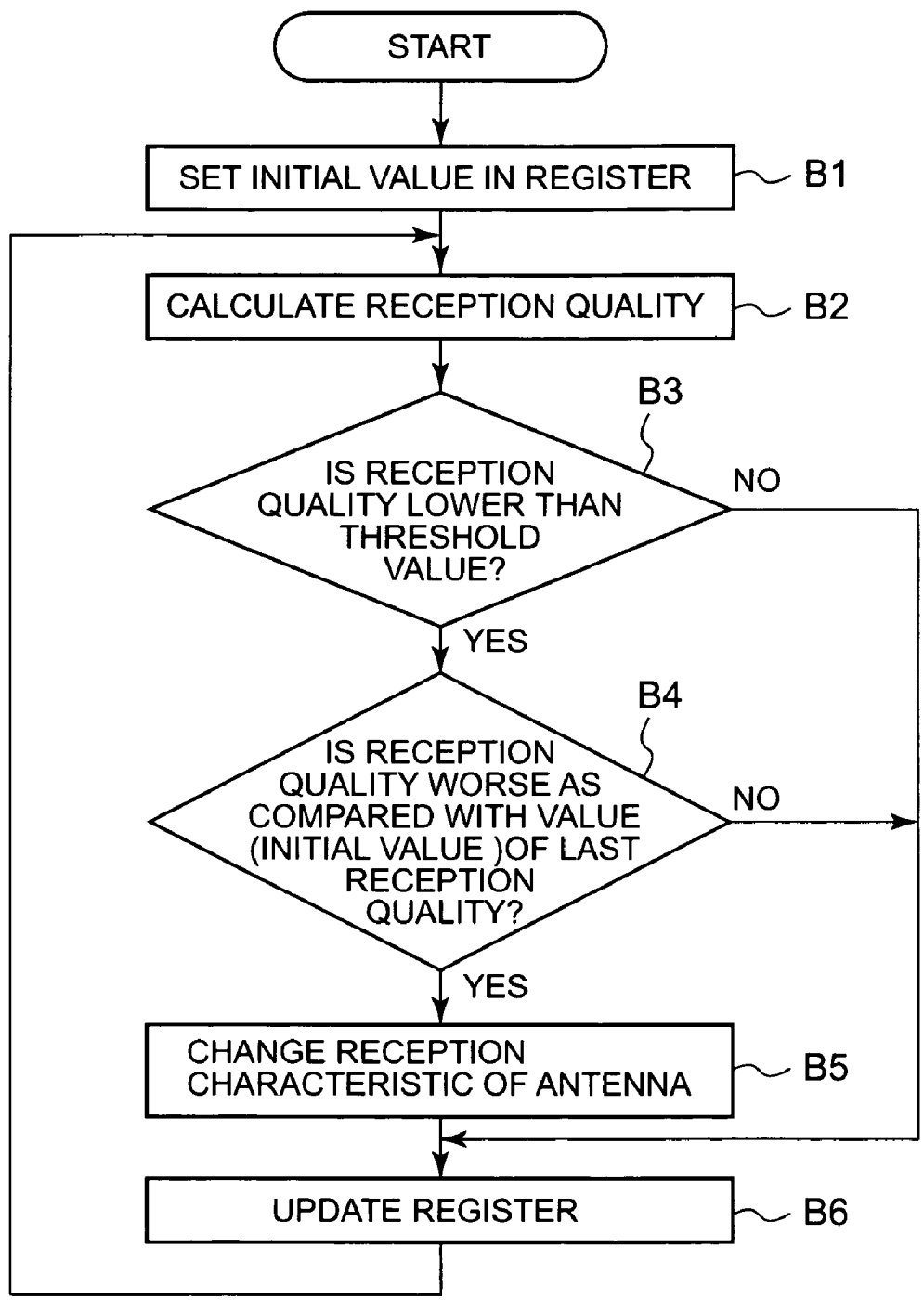
FIG. 7 is a flowchart for illustrating the processing of a reception quality detection circuit and the antenna control circuit of the second embodiment.

FIG. 7 is a flowchart of illustrating the flow of the operations of the reception quality detection circuit 26 and the antenna control circuit 27a. First, the antenna control circuit 27a makes the register 271a store the initial value of the comparison value for comparing with the value of a reception quality (Step B1). The reception quality detection circuit 26 calculates the present reception quality (Step B2). The comparator 274a compares the value of the present reception quality with the threshold value stored in the register 271a. When the value of the present reception quality is equal to or more than the threshold value (Step B3; No), the comparator 274a outputs the voltage indicating "0" as the signal S4a, and the flow of the operations advances to Step B6. On the other hand, when the value of the present reception quality is worse than the threshold value (Step B3; Yes), the comparator 274a outputs the voltage indicating "1" as the signal S4a.

The comparator 272a compares the value of the present reception quality and the value of the last reception quality stored in the register 271a (or the initial value) When the value of the present reception quality is equal to or more than the value of the last reception quality (Step B4; No), the flow of the operations advances to Step B6. On the other hand, when the value of the present reception quality has become worse than the value of the last reception quality (Step B4; Yes), the comparator 272a outputs the voltage indicating "1" as the signal S2a. Then, the switch 273a changes the voltage level of the signal S3 from the voltage V0 [V] to the voltage V1 [V], or from the voltage V1 [V] to the voltage V0 [V] (Step B5). Successively, the antenna control circuit 27a updates the storage content of the register 271a to the value of the present reception quality (step B6).

Figure 8:
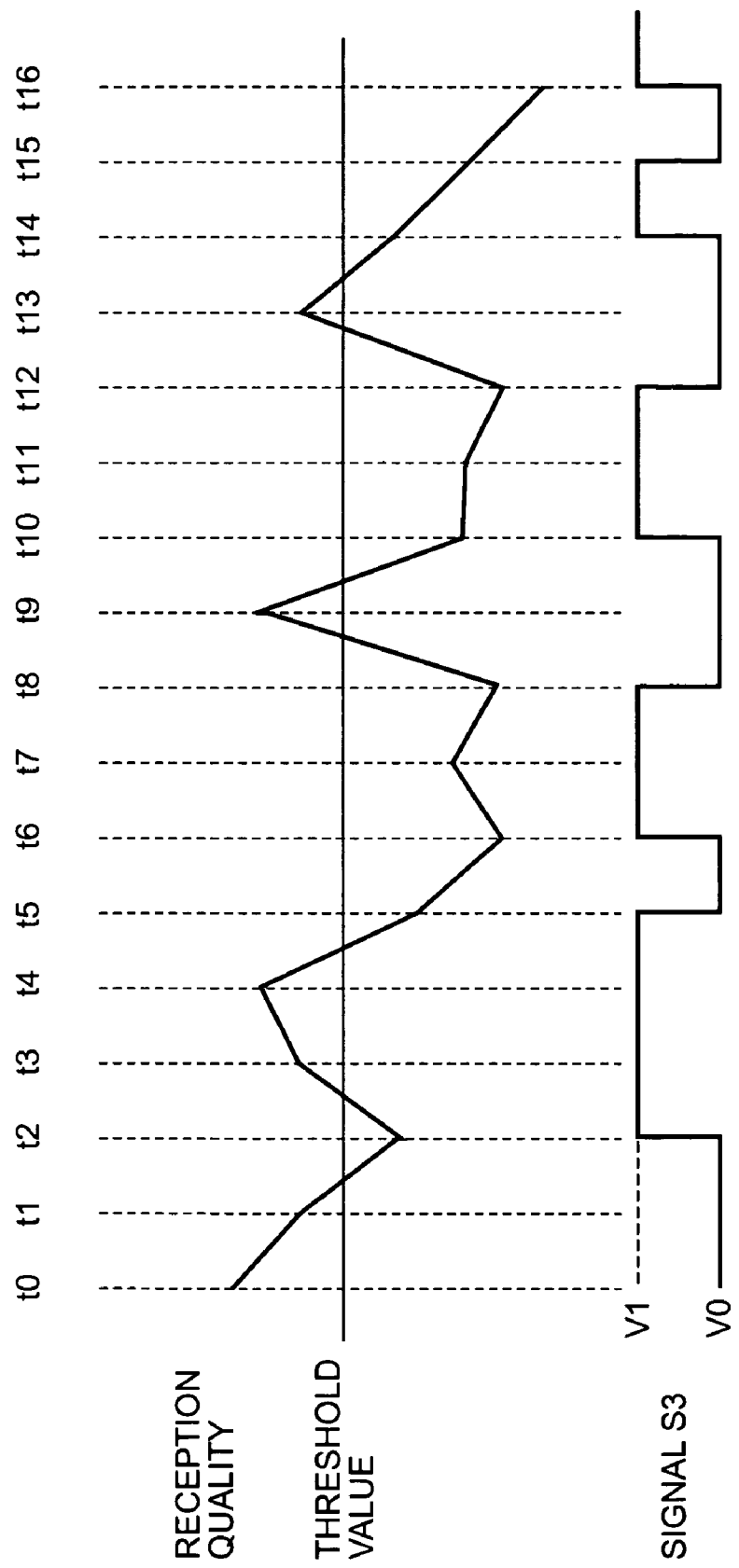
FIG. 8 is a diagram for illustrating the changes of the value of reception quality and the signal S3 of the second embodiment.

FIG. 8 is a graph showing the values of the reception quality output from the reception quality detection circuit 26, and the voltage levels of the signal S3 output from the antenna control circuit 27a. The ordinate axis of the graph indicates the value levels of the reception quality, or the voltage levels of the signal S3, and the abscissa axis of the graph shows times. The voltage level of the signal S3 is V0 [V] first at the time of power supply of the receiving apparatus 100 (time t0). Around the auxiliary antenna 32, electric field hardly occurs, and the antenna 31 receives an electric wave with the first reception characteristic.

Next, at a time t1, because the value of the reception quality has become lower (worse) than the value of the reception quality at a time t0, the comparator 272a outputs the voltage indicating "1" as the signal S2a. However, because the value of the reception quality is equal to or more than the threshold value, the comparator 274a outputs the voltage indicating "0" as the signal S4a. Consequently, the switch 273a does not change the voltage level of the signal S3 to maintain the voltage level.

Successively, at a time t2, because the value of the reception quality has become lower (worse) than the value of the reception quality at the time t1, the comparator 272a again outputs the voltage indicating "1" as the signal S2a. Furthermore, because the value of the reception quality has become lower (worse) than the threshold value, the comparator 274a outputs the voltage indicating "1" as the signal S4a. Thereby, the switch 273a changes the voltage level of the signal S3 from the voltage V0 [V] to the voltage V1 [V]. The voltage V1 [V] is applied to the auxiliary antenna 32, and the antenna 31 receives an electric wave with the second reception characteristic. On and after that, such control is repeated.

As described above, by comparing the value of the present reception quality of a received signal with the threshold value, and by comparing the value of the last reception quality with the value of the present reception quality, respectively, and then by changing the voltage applied to the auxiliary antenna 32 according to the comparison results, the electric field (the electric potential) generated around the auxiliary antenna 32 is changed, and the reception characteristic of the antenna 31 can be changed. Thereby, because the reception state of the electric wave of the antenna 31 is changed, even when noises have occurred in the same band as the receiving band, the optimum reception quality can be secured.

Third Embodiment

In the second embodiment, the description has been given to the case where the voltage applied to the auxiliary antenna 32 is changed according to a comparison result of the present reception quality and the last reception quality of the received signal, and a comparison result of the present reception quality and the threshold value. In a third embodiment, a description is given to a case where the voltage applied to the auxiliary antenna 32 is changed based on three comparison results of (1) a comparison result of the present reception quality and the last reception quality of a received signal, (2) a comparison result of the present reception quality and a threshold value, and (3) a comparison result of the last reception quality and the threshold value. Incidentally, the configuration of the receiving apparatus of the third embodiment is that of the receiving apparatus 100, which has been described in the first embodiment, in which the antenna control circuit 27 is replaced by an antenna control circuit 27b shown in FIG. 9. Accordingly, the descriptions of the same components as those of the first embodiment are omitted, and a description is given only to the antenna control circuit 27b.

Figure 9:
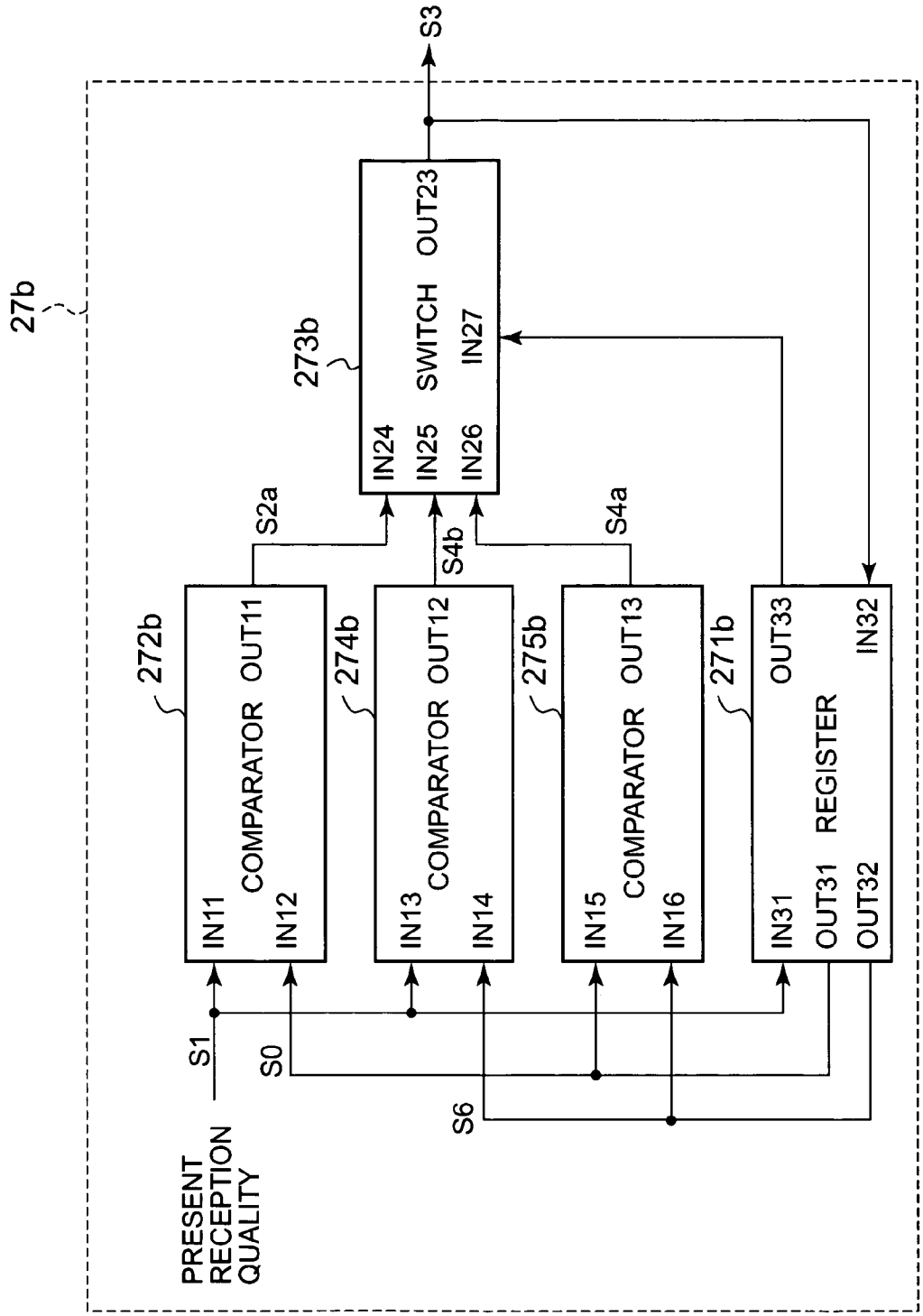
FIG. 9 is a block diagram showing an antenna control circuit of a third embodiment.

FIG. 9 is a block diagram of the antenna control circuit 27b. The antenna control circuit 27b is composed of comparators 272b, 274b and 275b, a switch 273b and a register 271b. From the register 271b, the value (S0) of the last reception quality is output through the terminal OUT31, and a threshold value (S6) is output through the terminal OUT32. Moreover, the value (S1) of the present reception quality is input through the terminal IN31 of the register 271b, and the value (S1) of the present reception quality is stored in the register 271b as the updated value (S0) of the last reception quality. The value (S1) of the present reception quality is input into the terminal IN11 of the comparator 272b, and the value (S0) of the last reception quality stored in the register 271b is input into the terminal IN12. The value (S1) of the present reception quality is input into the terminal IN13 of the comparator 274b, and the threshold value (S6) stored in the register 271b is input into the terminal IN14. The value (S0) of the last reception quality stored in the register 271b is input into a terminal IN15 of the comparator 275b, and the threshold value (S6) is input into a terminal IN16.

The comparator 272b compares the value (S1) of the present reception quality with the value (S0) of the last reception quality. When the value (S1) of the present reception quality has become worse than the value (S0) of the last reception quality, the comparator 272b outputs the voltage indicating "1" as a signal S2b from the terminal OUT11. On the other hand, when the value (S1) of the present reception quality is equal to or more than the value (S0) of the last reception quality, the comparator 272b outputs the voltage indicating "0" as the signal S2b from the terminal OUT11.

The comparator 274b compares the value (S1) of the present reception quality with the threshold value (S6). When the value (S1) of the present reception quality has become worse than the threshold value (S6), the comparator 274b outputs the voltage indicating "1" as a signal S4b from the terminal OUT12. On the other hand, when the value (S1) of the present reception quality is equal to or more than the threshold value (S6), the comparator 274b outputs the voltage indicating "0" as the signal S4b from the terminal OUT12.

The comparator 275b compares the value (S0) of the last reception quality with the threshold value (S6). When the value (S0) of the last reception quality has become worse than the threshold value (S6), the comparator 275b outputs the voltage indicating "1" as a signal S5b from a terminal OUT13. On the other hand, when the value (S0) of the last reception quality is equal to or more than the threshold value (S6), the comparator 275b outputs the voltage indicating "0" as the signal S5b from the terminal OUT13.

The signal S2b is input into a terminal IN24 of the switch 273b, and the signal S4b is input into a terminal IN25. The signal S5b is input into a terminal IN126. Moreover, a voltage change flag according to a voltage change of the signal S3 output from the switch 273b is stored in the register 271b. When the voltage level of the signal S3 has been changed by the switch 273b, the voltage indicating "1" is stored as the voltage change flag. When the voltage level of the signal S3 has not been changed to be maintained, the voltage indicating "0" is stored as the voltage change flag. The storage content of the voltage change flag stored in the register 271b is input into a terminal IN27 of the switch 273b.

Then, the switch 273b changes the voltage level of the signal S3 in conformity with the signals S2b, S4b and S5b, and the voltage change flag, and outputs the changed signal S3 through a terminal OUT23. It is supposed that the voltage level of the signal S3 at the time of power supply to the receiving apparatus 100 is the voltage V0 [V]. After that, (1) when the signal S2b takes the voltage indicating "1", the signal S4b takes the voltage indicating "1", and the signal S5b takes the voltage indicating "0", or (2) when the signal S2b takes the voltage indicating "1", the signal S4b takes the voltage indicating "1", the signal S5b takes the voltage indicating "1", and the voltage change flag takes the voltage indicating "1", the switch 273b changes the voltage level of the signal S3 from the voltage V0 [V] to the voltage V1 [V], or from the voltage V1 [V] to the voltage V0 [V], and outputs the changed signal S3.

On the other hand, (3) when the signal S2b takes the voltage indicating "0", (4) when the signal S4b takes the voltage indicating "0", or (5) when the signal S2a takes the voltage indicating "1", the signal S4b takes the voltage indicating "1", the signal S5b takes the voltage indicating "1", and the voltage flag takes the voltage indicating "0", the switch 273b holds the voltage level of the signal S3. Incidentally, the judgment of whether the switch 273b changes the voltage level of the signal S3 or not is performed in a predetermined period in synchronization with a clock signal output from a not shown clock circuit.

That is, (1) when the value (S1) of the present reception quality is lower (worse) than the value (S0) of the last reception quality, the value (S1) of the present reception quality is lower than the threshold value (S6), and the value (S0) of the last reception quality is higher than the threshold value (S6), and (2) when the value (S1) of the present reception quality has become lower (worse) than the value (S0) of the last reception quality, the value (S1) of the present reception quality is lower than the threshold value (S6), the value (S0) of the last reception quality is also lower than the threshold value, and the voltage level of the signal S3 has been changed last time, the switch 273b changes the voltage level of the signal S3. However, (3) when the value (S1) of the present reception quality is equal to or more than the value (S0) of the last reception quality, (4) when the value (S1) of the present reception quality is equal to or more than the threshold value (S6), or (5) when the value (S1) of the present reception quality has become worse than the value S (0) of the last reception quality, and is lower than the threshold value (S6), and the value (S0) of the last reception quality is also lower than the threshold value (S6), but the voltage of the signal S3 has not been changed last time, the switch 273b does not change the voltage level of the signal S3, and maintains the voltage level.

Figure 10:
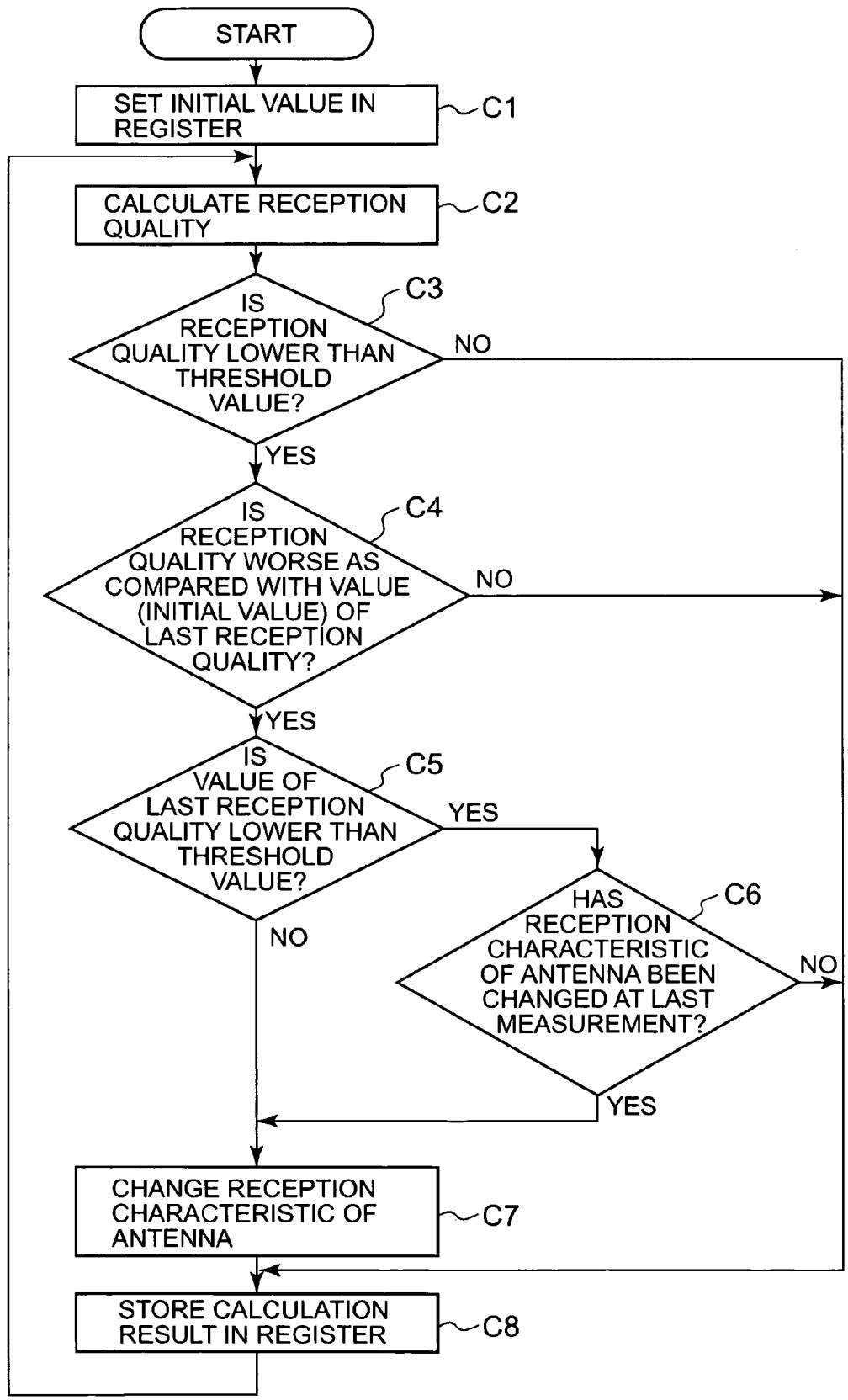
FIG. 10 is a flowchart for illustrating the processing of a reception quality detection circuit and the antenna control circuit of the third embodiment.

FIG. 10 is a flowchart for illustrating the flow of the operations of the reception quality detection circuit 26 and the antenna control circuit 27b. First, the antenna control circuit 27b makes the register 271b store the initial value of the comparison value for comparing with the value of the present reception quality. The initial value may be a predetermined value, or may be the value of the present reception quality stored in the register 271b as the initial value (Step C1). The reception quality detection circuit 26 calculates the present reception quality (Step C2). The comparator 274b compares the value of the present reception quality with the threshold value stored in the register 271b. When the value of the present reception quality is equal to or more than the threshold value (Step C3; No), the comparator 274b outputs the voltage indicating "0" as the signal S4b, and the flow of the operations advances to Step C8. On the other hand, when the value of the present reception quality is worse than the threshold value (Step C3; Yes), the comparator 274b outputs the voltage indicating "1" as the signal S4b.

The comparator 272a compares the value of the present reception quality with the value of the last reception quality stored in the register 271a (or the initial value). When the value of the present reception quality is equal to or more than the value of the last reception quality (Step C4; No), the flow of the operations advances to Step C8. On the other hand, when the value of the present reception quality has become worse than the value of the last reception quality (Step C4; Yes), the comparator 272a outputs the voltage indicating "1" as the signal S2b.

The comparator 275b compares the value of the last reception quality stored in the register 271b with the threshold value. When the value of the last reception quality is equal to or more than the threshold value (Step C5; No), the comparator 275b outputs the voltage indicating "1" as the signal S5b. Then, the switch 273b changes the voltage level of the signal S3 from the voltage V0 [V] to the voltage V1 [V], or from the voltage V1 [V] to the voltage V0 [V] (Step C7).

On the other hand, when the value of the last reception quality is worse than the threshold value (Step C5; Yes), the switch 273b judges whether the voltage of the voltage change flag stored in the register 271b indicates "0" or "1." When the voltage of the voltage change flag indicates "0" (Step C6; No), the processing of the operations advances to Step C8. When the voltage of the voltage change flag indicates "1" (Step C6; Yes), the switch 273b changes the voltage level of the signal S3 from the voltage V0 [V] to the voltage V1 [V], or from the voltage V1 [V] to the voltage V0 [V] (Step C7).

Successively, the antenna control circuit 27b updates the storage content of the register 271b to the value of the present reception quality (step C8).

Figure 11:
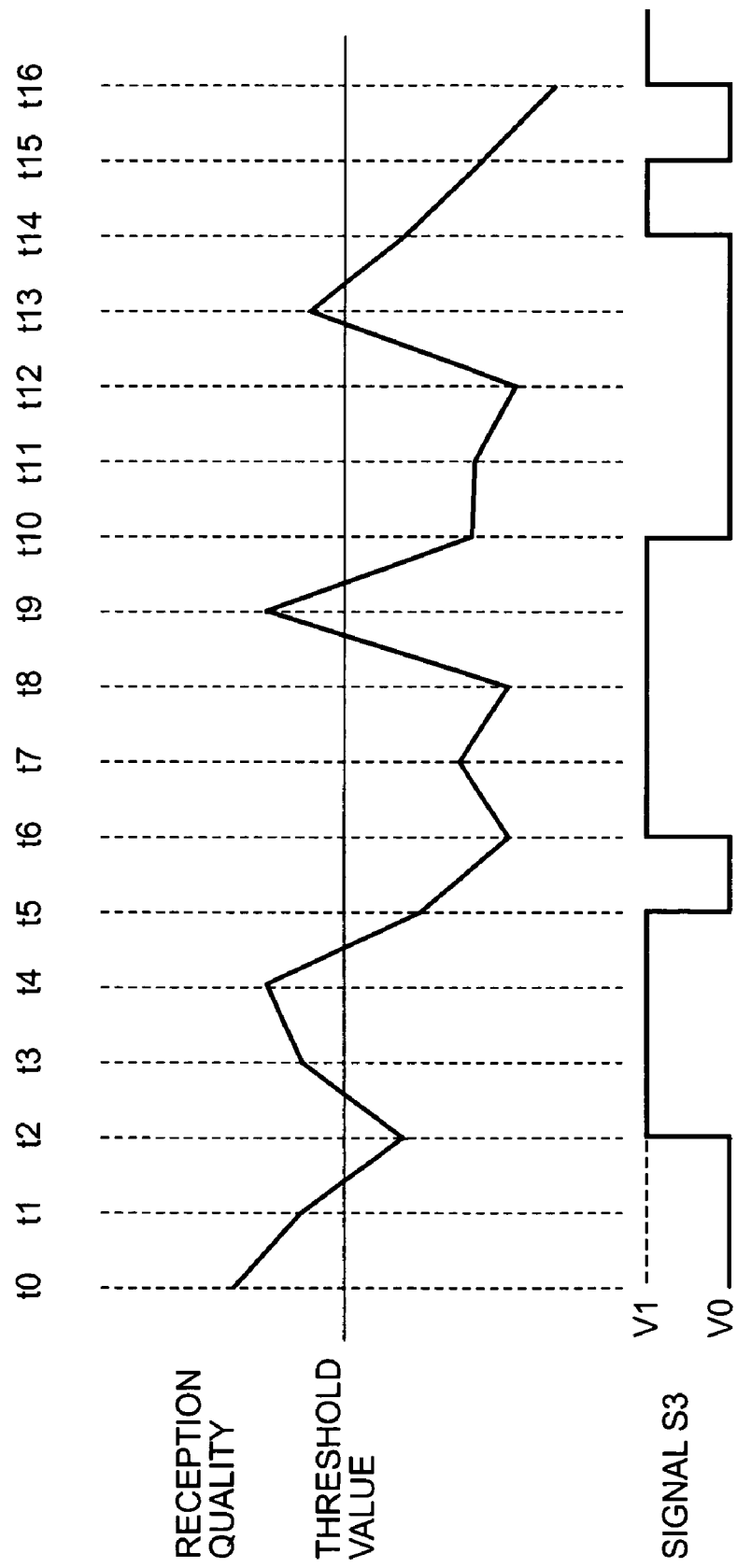
FIG. 11 is a diagram for illustrating the changes of the value of reception quality and the signal S3 of the third embodiment.

FIG. 11 is a graph showing the values of the reception quality output from the reception quality detection circuit 26, and the voltage levels of the signal S3 output from the antenna control circuit 27b. The ordinate axis of the graph indicates the value levels of the reception quality, or the voltage levels of the signal S3, and the abscissa axis of the graph shows times. For showing the differences from the operations of the antenna control circuits of the first and the second embodiments, the operation of the antenna control circuit 27b is described from a time t6. At the time t6, because the voltage level of the signal S3 is V1 [V], the antenna 31 receives an electric wave with the second reception characteristic.

Next, at a time t7, because the value of the reception quality has become better than the value of the reception quality at the time t6, the comparator 272b outputs the voltage indicating "0" as the signal S2b. Consequently, the switch 273b does not change the voltage level of the signal S3 to maintain the voltage level V1 [V].

Successively, at a time t8, because the value of the reception quality has become worse than the value of the reception quality at the time t7, the comparator 272b outputs the voltage indicating "1" as the signal S2b. Furthermore, because the value of reception quality is worse than the threshold value, the comparator 274b outputs the voltage indicating "1" as the signal S4b. Also the value of the last reception quality is worse than the threshold value, the comparator 275b outputs the voltage indicating "1" as the signal S5b. However, because the voltage level of the signal S3 has not changed at the time t7, the switch 273b does not change the voltage level of the signal S3, and maintains the voltage V1 [V].

Then, at a time t10, because the value of the reception quality has become worse than the value of the reception quality at a time t9 and is lower than the threshold value and further the value of the reception quality at the time t9 is equal to or more than the threshold value, the switch 273b changes the voltage level of the signal S3 from the voltage V1 [V] to the voltage V0 [V]. The voltage V0 [V] is applied to the auxiliary antenna 32, and the antenna 31 receives an electric wave with the first reception characteristic. On and after that, such control is repeated.

As described above, by comparing the value of the present reception quality of a received signal with the threshold value, the value of the last reception quality with the value of the present reception quality, and the value of the last reception quality with the threshold value, respectively, and then by changing the voltage applied to the auxiliary antenna 32 according to the comparison results and whether the voltage applied to the auxiliary antenna 32 has been changed or not at the last time, the electric field (the magnetic field) generated around the auxiliary antenna 32 is changed, and the reception characteristic of the antenna 31 can be changed. Thereby, because the reception state of the electric wave of the antenna 31 is changed, even when noises have occurred in the same band as the receiving band, the optimum reception quality can be always secured.

Fourth Embodiment

Next, a fourth embodiment is described.

Figure 12:
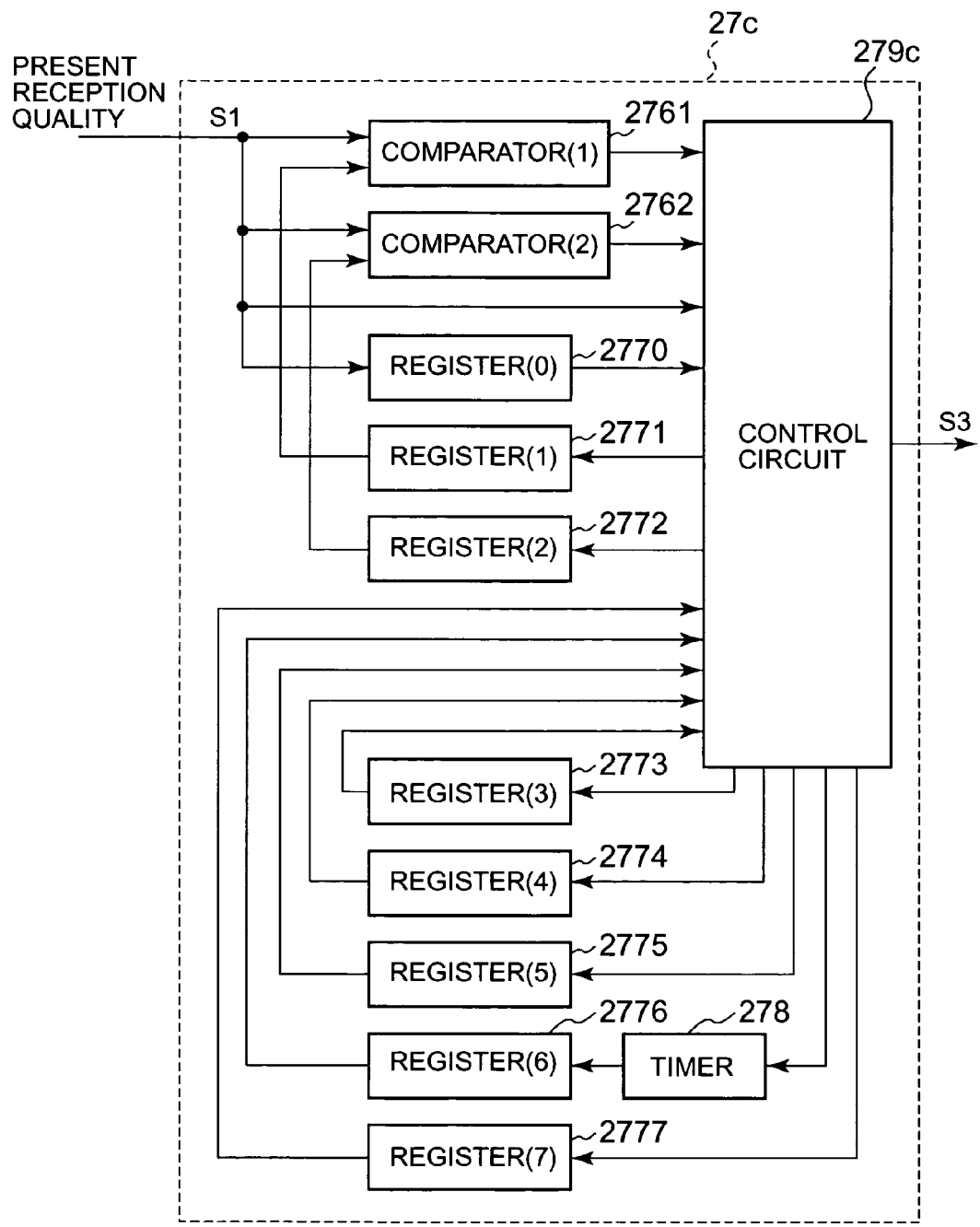
FIG. 12 is a block diagram showing an antenna control circuit of a fourth embodiment.

The configuration of the receiving apparatus of the fourth embodiment is that of the receiving apparatus 100, which has been described in the first embodiment, in which the antenna control circuit 27 is replaced by an antenna control circuit 27c shown in FIG. 12. Accordingly, the descriptions of the components same as those of the first embodiment are omitted, and a description is to be given laying stress on the antenna control circuit 27c.

FIG. 12 is a block diagram of the antenna control circuit 27c in the fourth embodiment. The antenna control circuit 27c changes the voltage level of the signal S3 applied to the auxiliary antenna 32 based on a comparison result of the value of the present reception quality with a threshold level, a comparison result of the value of the present reception quality with the value of the last reception quality of a received signal, a comparison result of the value of the last reception quality with the threshold value, and a duration of a state in which the value of the reception quality is lower than the threshold value.

According to FIG. 12, the antenna control circuit 27c is composed of comparators 2761 and 2762, registers 2770-2777, a control circuit 279c and a timer 278.

The value of the present reception quality input from the reception quality detection circuit 26 is stored in the register 2770. A predetermined threshold value of the reception quality input from the control circuit 279c is stored in the register 2771. The value of the last reception quality input from the control circuit 279c is stored in the register 2772. The value indicating the existence of a change of the voltage level of the signal S3 at the last detection, i.e. the existence of a change of the reception characteristic of the antenna 31, which is input from the control circuit 279c, is stored in the register 2773. The last comparison result by the comparator 2761, i.e. the result of the comparison of the value of the last reception quality with the threshold value, which is input from the control circuit 279c, is stored in the register 2774.

A value indicating whether the timer 278 is performing the counting operation thereof or not, which is input from the control circuit 279c, is stored in the register 2775. The value counted by the timer 278 is stored in the register 2776. A rated value of the counted value of the timer 278 input from the control circuit 279c is stored in the register 2777. Here, the rated value of the counted value is the upper limit of the duration of the state of the reception characteristic of the antenna 31 which has not been changed for a certain time or longer, which upper limit is set for detecting the state.

The comparator 2761 compares the value of the present reception quality input from the reception quality detection circuit 26 with the threshold value of the reception quality input from the register 2771, and outputs a signal of a level corresponding to the comparison result. In concrete terms, when the value of the present reception quality is lower (worse) than the threshold value, the comparator 2761 outputs a signal of an "H" level. When the value of the present reception quality is equal to the threshold value or higher (better) than the threshold value, the comparator 2761 outputs a signal of an "L" level.

The comparator 2762 compares the value of the present reception quality input from the reception quality detection circuit 26 with the value of the last reception quality input from the register 2772, and outputs a signal of a level corresponding to the comparison result. In concrete terms, when the value of the present reception quality is lower (worse) than the value of the last reception quality, the comparator 2762 outputs a signal of the "H" level. When the value of the present reception quality is equal to the value of the last reception quality or higher (better) than the value of the last reception quality, the comparator 2762 outputs a signal of the "L" level.

The control circuit 279c changes the voltage level of the signal S3 from the voltage V0 to the voltage V1 or from the voltage V1 to the voltage V0 based on the value of the reception quality input from the reception quality detection circuit 26, the comparison results of the comparators 2761 and 2762, and the values stored in the registers 2770-2777.

The timer 278 performs a count operation in conformity with the control of the control circuit 279c. In concrete terms, when a start of a count operation is instructed by the control circuit 279c, the timer 278 is counting up in synchronization with, for example, a not shown clock signal.

Figure 13:
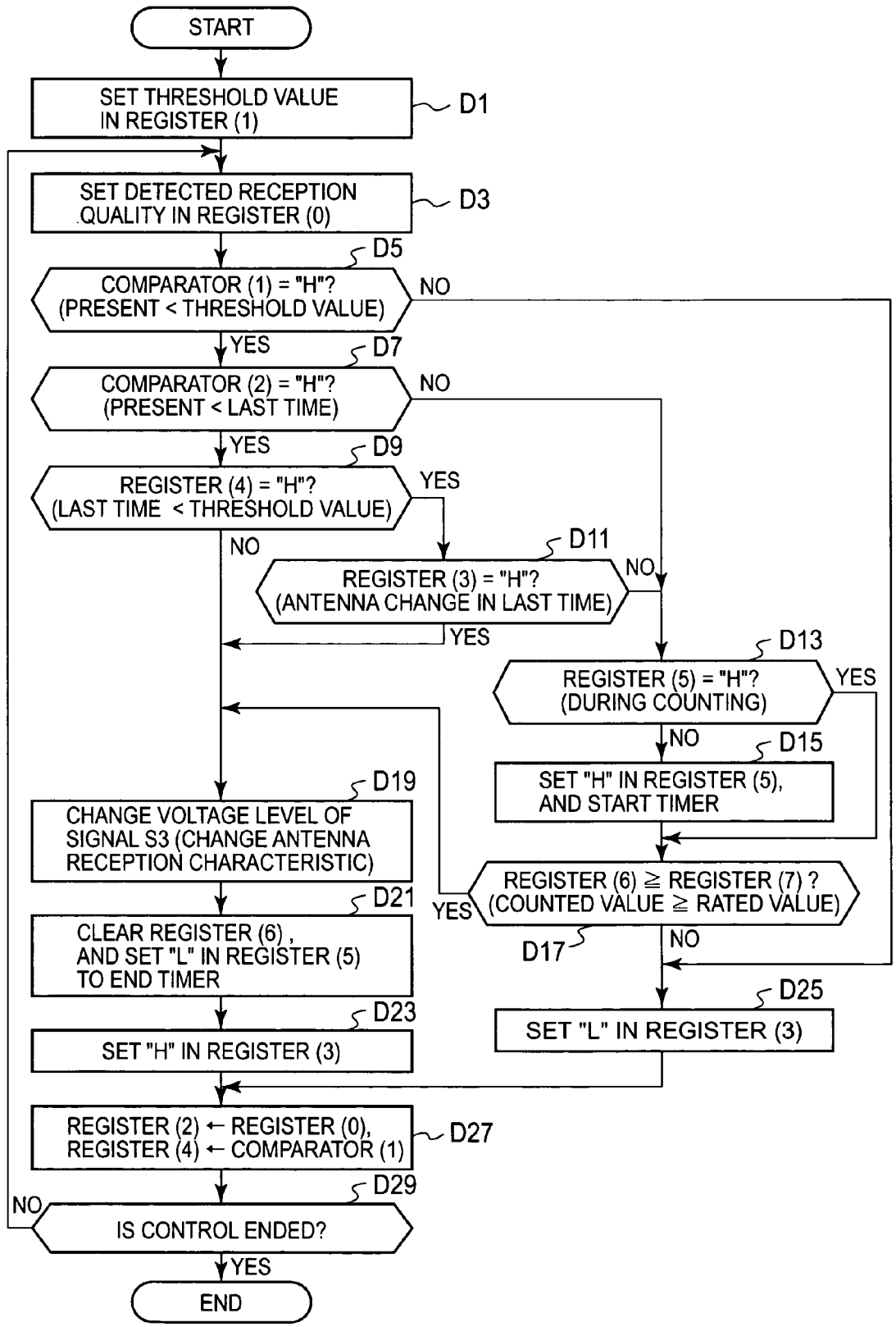
FIG. 13 is a flowchart for illustrating the operation of the antenna control circuit of the fourth embodiment.

FIG. 13 is a flowchart for illustrating the flow of the operation of the antenna control circuit 27c of the fourth embodiment. According to FIG. 13, the control circuit 279c makes the register 2771 store the predetermined threshold value of the reception quality first (Step D1).

Next, the control circuit 279c makes the register 2770 store the value of the reception quality detected by the reception quality detection circuit 26 as the present reception quality (Step D3). Successively, the control circuit 279c judges the level of the output signal of the comparator 2761. When the level is "L", i.e. when the value of the present reception quality is equal to or more than the threshold value (Step D5; No), the control circuit 279*c* advances it processing to Step D25.

On the other hand, when the level of the output signal of the comparator 2761 is "H", i.e. when the value of the present reception quality is lower than the threshold value (Step D5; Yes), the control circuit 279*c* judges the level of the output signal of the comparator 2762. When the level is "H", i.e. when the value of the present reception quality has fallen from the value of the last reception quality (Step D7; Yes), the control circuit 279*c* further judges the value stored in the register 2774. When the value stored in the register 2774 is "L", i.e. when the value of the last reception quality is equal to or more than the threshold value (Step D9; No), the control circuit 279*c* advances its processing to Step D19.

On the other hand, when the value stored in the register 2774 is "H", i.e. when the value of the last reception quality is lower than the threshold value (Step D9; Yes), the control circuit 297*c* judges the value stored in the register 2773. When the value stored in the register 2773 is "H", i.e. when a change of the reception characteristic of the antenna 31 has been performed at the last detection (Step D11; Yes), the control circuit 279*c* advances its processing to Step D19.

When the value stored in the register 2773 is "L", i.e. when no changes of the reception characteristic of the antenna 31 has been performed at the last detection (Step D11; No), or when the level of the output signal of the comparator 2762 is "L", i.e. when the value of the present reception quality has become equal to or more than the value of the last reception quality (step D7; No), the control circuit 279*c* successively judges the value stored in the register 2775. When the value stored in the register 2775 is "L", i.e. when the timer 278 is not performing its count operation (Step D13 No), the control circuit 279*c* starts the count operation of the timer 278, and makes the register 2775 store the "H" level signal, which indicates that the timer 278 is performing its count operation (Step D15).

Successively, the control circuit 279*c* compares the value stored in the register 2776 with the value stored in the register 2777. When the value stored in the register 2776 is equal to or more than the value stored in the register 2777, i.e. when the counted value of the timer 278 has reached the rated value (Step D17; Yes), the control circuit 279*c* advances it processing to Step D19. When the value stored in the register 2776 is smaller than the value stored in the register 2777, i.e. when the counted value has not reached the rated value (Step D17; No), the control circuit 279*c* advances its processing to Step D25.

Then, at Step D19, the control circuit 279*c* changes the voltage level of the signal S3, and thereby changes the reception characteristic of the antenna 31 (Step D19). Successively, the control circuit 279*c* ends the count operation of the timer 278, and clears the counted value stored in the register 2776 to be zero. Then, the control circuit 279*c* makes the register 2775 store the level "L", which indicates that the timer 278 is not performing its count operation (Step D21). After that, the control circuit 279*c* makes the register 2773 store the level "H", which indicates that the change of the reception characteristic has been performed (Step D23). Moreover, at Step D25, the control circuit 279*c* makes the register 2773 store the level "L", which indicates that no changes of the reception characteristic of the antenna 31 have been made (Step D25).

After that, the control circuit 279*c* makes the register 2772 store the value of the present reception quality stored in the register 2770, and makes the register 2774 store the comparison result of the comparator 2761 (Step D27). Then, the control circuit 279*c* judges whether the antenna control is ended or not. When the antenna control is not ended (Step D29; No), the control circuit 279*c* returns its processing to Step D3. When the antenna control is ended (Step D29; Yes), the control circuit 279*c* ends the present processing.

Figure 14:
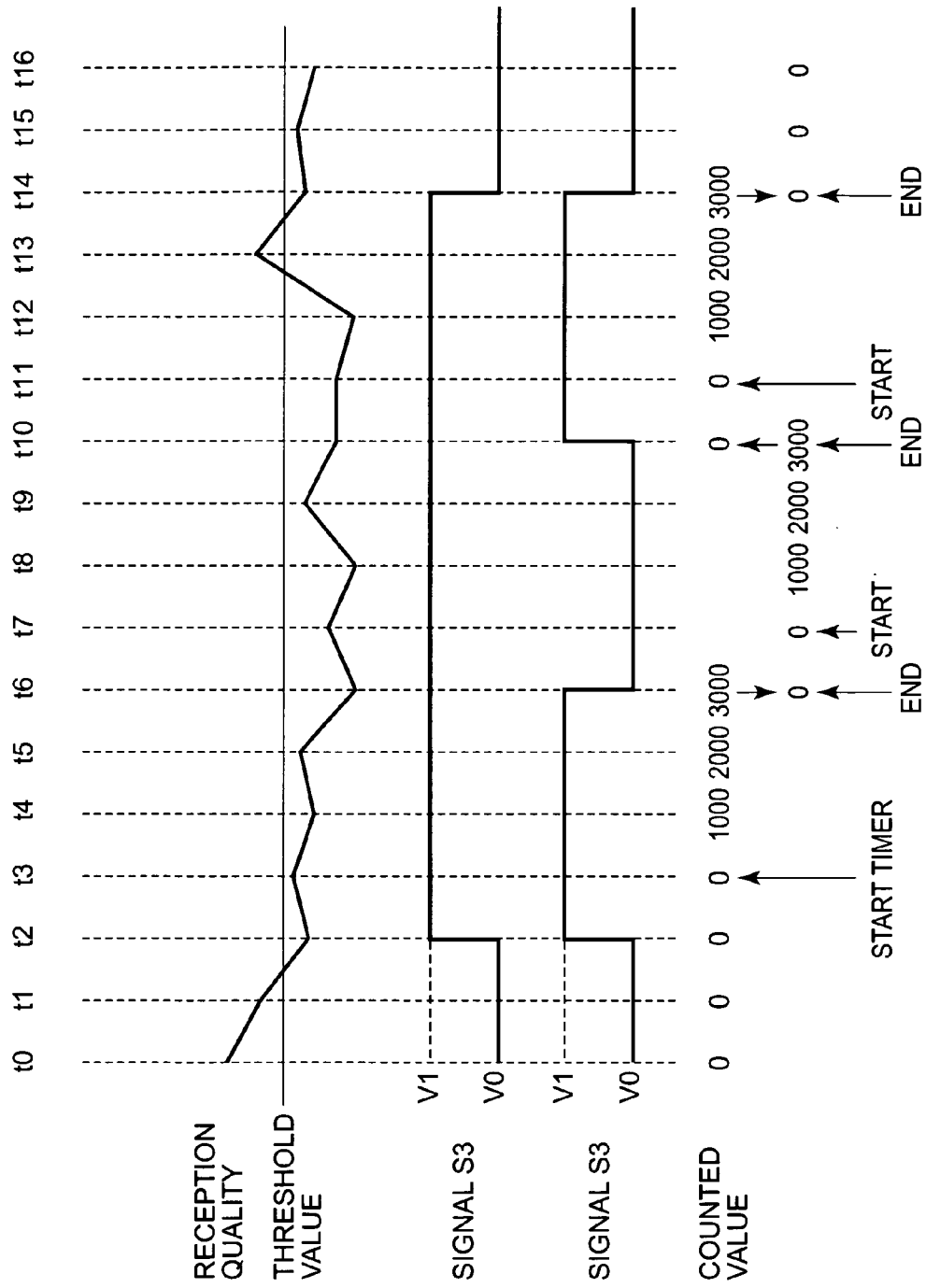
FIG. 14 is a diagram for illustrating the changes of the value of reception quality and the signal S3 of the fourth embodiment.

FIG. 14 is a diagram showing an example of each signal waveform in the control circuit 279*c*. By setting the abscissa axis thereof as times, FIG. 14 shows the values of the reception quality detected by the reception quality detection circuit 26, the voltage levels of the signal S3 in the case of changing the voltage level of the signal S3 only when the value of the reception quality falls below the threshold value (hereinafter referred to as a signal S3'), the voltage levels of the signal S3 in the fourth embodiment, and the counted values of the timer 278 in order from the top.

Here, the control circuit 279*c* executes the processing shown in the flowchart of FIG. 13 in synchronization with the not shown clock signal. Then, each of the time intervals between respective times t0, t1, t2, . . . in FIG. 14 corresponds to a time necessary for changing the reception characteristic of the antenna 31 once (i.e. a time necessary for the execution of Steps D3-D29), and the time intervals take a value such as 1 [ms], 100 [ms] and 1 [s] according to the frequency of the clock signal and the processing speed of the control circuit 279*c*. The counted value of the timer 278 at each time t becomes a value according to the frequency of the clock signal of the control circuit 279*c*, the frequency of the clock signal of the timer 278, and the time intervals of the times t.

In concrete terms, for example, as shown in FIG. 14, in the case where the frequency of the clock signal of the control circuit 279*c* and the frequency of the clock signal of the timer 278 are set to the same 1 [MHz] and the time intervals of the times t are set to 1 [ms], the counted value of the timer 278 is counted up by "1000 (=1 [ms]/1 [MHz])" every time t. Incidentally, in FIG. 14, the rated value of the counted value is set as "2500."

Moreover, in the case where the frequency of the clock signal of the control circuit 279*c* is set as 1 [MHz] and the time intervals of the times t are set as 1 [ms] and further the frequency of the clock signal of the timer 278 is set as 1 [kHz], the counted value of the timer 278 is counted up by "1 (=1 [ms]/1 [kHz])" every time t.

According to FIG. 14, at a time t0, the value of the reception quality is higher than the threshold value, and the voltage level of the signal S3 is V0. Moreover, the count operation of the timer 278 is not performed, and the counted value is an initial value "0."

At a time t1, although the value of the reception quality has fallen from the value of the last reception quality at the time t0, it is higher than the threshold value. Consequently, the voltage level of the signal level of the signal S3 is not changed, but the voltage V0 is maintained. Then, no changes of the reception characteristic of the antenna 31 are performed.

At a time t2, because the value of the reception quality has fallen from the value of the last reception quality at the time t1 and has become lower than the threshold value, the voltage level of the signal level of the signal S3 is changed from the voltage V0 to the voltage V1, and the change of the reception characteristic of the antenna 31 is performed.

At a time t3, although the value of the reception quality is higher than the value of the last reception quality at the time t2, it is lower than the threshold value. Consequently, the voltage level of the signal S3 is not changed, but the voltage V1 is maintained. No changes of the reception characteristic of the antenna 31 are performed. Moreover, the count operation of the timer 278 is started.

At a time t4, the value of the reception quality has fallen from the value of the last reception quality at the time t3. Moreover, because no changes of the reception characteristic of the antenna 31 are performed at the last time t3, the counted value of the timer 278 has become to "1000." However, because the value has not reached the rated value "2500", the voltage level of the signal S3 is not changed, but the voltage V1 is maintained. Then, no changes of the reception characteristic of the antenna 31 are performed.

At a time t5, although the value of the reception quality is higher than the value of the last reception quality at the time t4, it is lower than the threshold value. Moreover, although the counted value of the timer 278 has become "2000", the value has not reached the rated value "2500." Consequently, the voltage level of the signal S3 is not changed, but the voltage V1 is maintained. Then, no changes of the reception characteristic of the antenna 31 are performed.

At a time t6, the value of the reception quality has fallen from the value of the last reception quality at the time t5, and no changes of the reception characteristic of the antenna 31 are performed at the last time t5. Moreover, the counted value of the timer 278 has become "3000", and has reached the rated value "2500." For this reason, the voltage level of the signal S3 is changed from the voltage V1 to the voltage V0, and a change of the reception characteristic of the antenna 31 is performed. Then, the counted value is cleared to be zero, and the count operation of the timer 278 is ended.

At a time t7, although the value of the reception quality has become higher than the value of the last reception quality at the time t6, it is lower than the threshold value. Consequently, the voltage level of the signal S3 is not changed, but the voltage V0 is maintained. Then, no changes of the reception characteristic of the antenna 31 are performed. Moreover, the count operation of the timer 278 is again started.

Then, the similar control is repeated also at each time on and after that. That is, at each of times t8 and t9, the counted value becomes one having been increased by "1000." Then, at a time t10, when the counted value reached the rated value "2500", the voltage level of the signal S3 is changed from the voltage V0 to the voltage V1, and a change of the reception characteristic of the antenna 31 is performed. Then, the count operation is ended, and the counted value is cleared to be zero.

Successively, at a time t11, the count operation of the timer 278 is again started, and the counted value takes the value increased by "1000" at each of times t12 and t13. Then, at a time t14, when the value of the reception quality again becomes lower than the threshold value, the voltage level of the signal S3 is changed from the voltage V1 to the voltage V0, and a change of the reception characteristic of the antenna 31 is performed. Furthermore, the count operation of the timer 278 is ended, and the counted value thereof is cleared to be zero.

As described above, according to the fourth embodiment, the value of the reception quality of a received signal and the threshold value are compared, and the reception characteristic of the antenna 31 can be changed based on the comparison result. That is, when the state of the reception quality being lower than the threshold value has continued for a predetermined time, the voltage level of the signal S3 applied to the auxiliary antenna 32 is changed, and the reception characteristic of the antenna 31 is thereby changed. Even if noises have occurred in the same band as the receiving band, it becomes possible to secure the optimum reception quality always. Moreover, because the sate in which the reception characteristic of the antenna 31 has not been performed is not continued for a predetermined time or longer, more optimum reception quality can be secured.

Fifth Embodiment

Next, a fifth embodiment is described.

Figure 15:
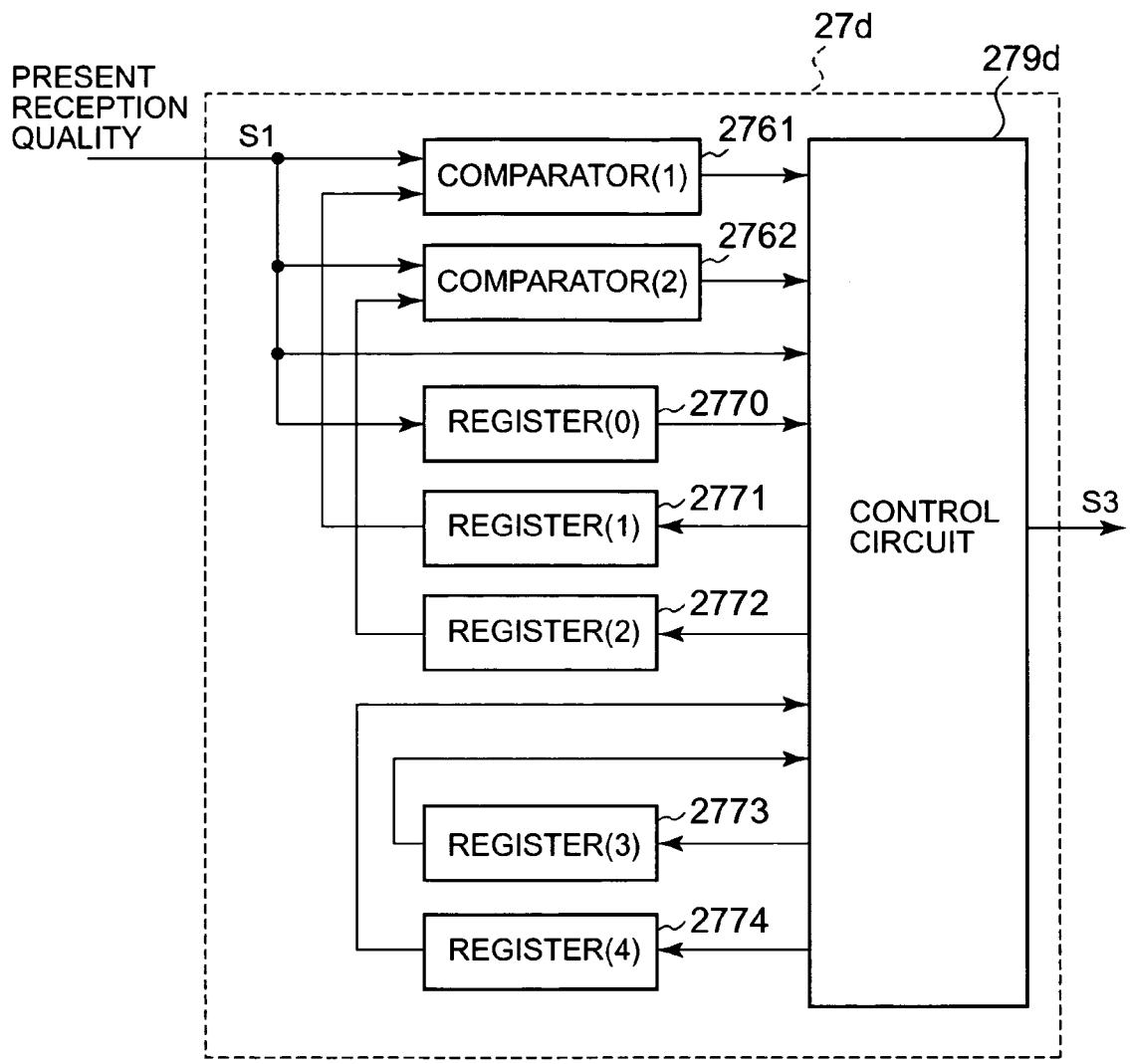
FIG. 15 is a block diagram showing an antenna control circuit of a fifth embodiment.

The configuration of the receiving apparatus of the fifth embodiment is that of the receiving apparatus 100, which has been described in the fourth embodiment, in which the antenna control circuit 27c is replaced by an antenna control circuit 27d shown in FIG. 15. Accordingly, in the following, the descriptions of the same components as those of the fourth embodiment are omitted, and a description is given laying stress on the antenna control circuit 27d.

FIG. 15 is a block diagram of the antenna control circuit 27d. The antenna control circuit 27d changes the voltage level of the signal S3 applied to the auxiliary antenna 32, and changes the threshold value, based on a comparison result of the value of the present reception quality with the threshold level, a comparison result of the value of the present reception quality with the value of the last reception quality, and a comparison result of the value of the last reception quality with the threshold value. According to FIG. 15, the antenna control circuit 27d is composed of registers 2770-2774, comparators 2761 and 2762, and a control circuit 279d.

The control circuit 279d changes the voltage level of the signal S3 from the voltage V0 to the voltage V1, or from the voltage V1 to the voltage V0, and outputs the changed signal S3, and further performs the control of raising or lowering the threshold value stored in the register 2771 within a predetermined range, based on the value of the reception quality input from the reception quality detection circuit 26, comparison results of the comparators 2761 and 2762, and the values stored in the registers 2770-2774.

Figure 16:
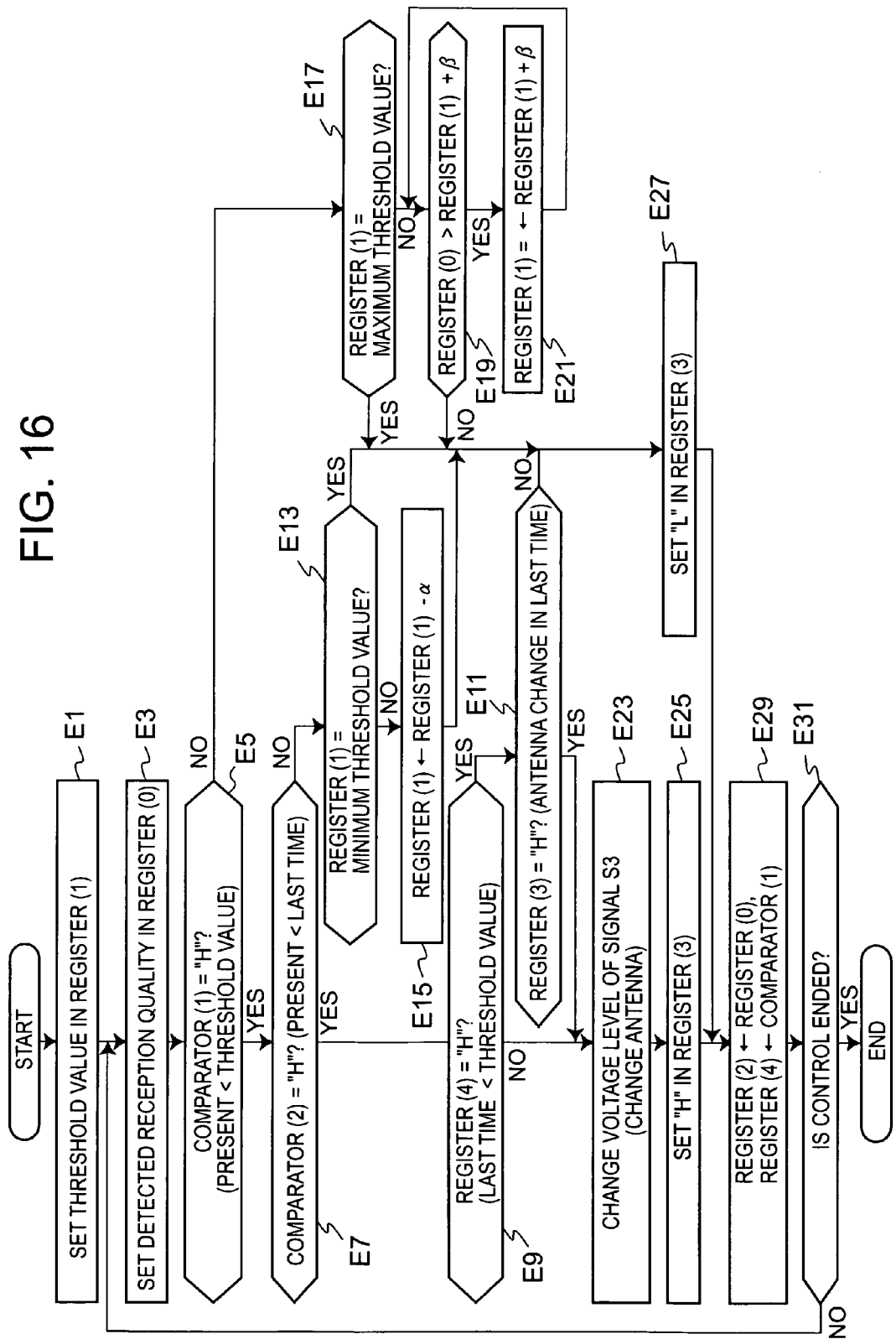
FIG. 16 is a flowchart for illustrating the operation of the antenna control circuit of the fifth embodiment.

FIG. 16 is a flowchart for illustrating the flow of the operation of the antenna control circuit 27d of the fifth embodiment. According to FIG. 16, the control circuit 279d makes the register 2771 store the predetermined threshold value of the reception quality first (Step E1).

Next, the control circuit 279d makes the register 2770 store the value of the reception quality detected by the reception quality detection circuit 26 as the value of the present reception quality (Step E3). Successively, the control circuit 279d judges the level of the output signal of the comparator 2761. When the level is "H" (Step E5; Yes), the control circuit 279d judges the level of the output signal of the comparator 2762.

When the level of the output signal of the comparator 2762 is "H" (Step E7; Yes), the control circuit 279d judges the value stored in the register 2774. When the value stored in the register 2774 is "L" (Step E9; No), the control circuit 279d advances its processing to Step E23. On the other hand, when the value stored in the register 2774 is "H" (Step E9; Yes), the control circuit 297d judges the value stored in the register 2773. When the value stored in the register 2773 is "H" (Step E11; Yes), the control circuit 279d advances its processing to Step E23. Moreover, when the value stored in the register 2773 is "L" (Step E11; No), the control circuit 279d advances its processing to Step E27.

When the level of the output signal of the comparator 2762 is "L" (step E7; No), the control circuit 279d compares the threshold value stored in the register 2771 with a predetermined minimum threshold value. When the threshold value does not agree with the minimum threshold value (Step E13; No), the control circuit 279d updates the threshold value stored in the register 2771 to a value lower than the threshold value by a predetermined lowering amount α, and thus lowers the threshold value (Step E15). Incidentally, here, when the value lower than the present threshold value by the lowering amount α is less than the minimum threshold value, the control circuit 279d sets the threshold value after the updating as the minimum threshold value. After that, the control circuit 279d advances its processing to Step E27.

On the other hand, when the level of the output signal of the comparator 2761 is "L" (Step E5; No), the control circuit 279d compares the threshold value stored in the register 2771 with a predetermined maximum threshold value. When the threshold value agrees with the maximum threshold value (Step E17; Yes), the control circuit 279d advances it processing to Step E27. On the other hand, when the threshold value stored in the register 2771 does not agree with the maximum threshold value (Step E17; No), the control circuit 279d compares the value of the present reception quality stored in the register 2770 with a value higher than the threshold value stored in the register 2771 by a predetermined raising amount β. When the value of the present reception quality is equal to or more than the value higher than the threshold value by the raising amount β (Step E19; No), the control circuit 279d updates the threshold value stored in the register 2771 to the value higher by the raising amount β to raise the threshold value (Step E21). Incidentally, here, when the value higher than the present threshold value by the raising amount β exceeds the maximum threshold value, the threshold value after the updating is set as the maximum threshold value. After that, the control circuit 279d returns its processing to Step E19. On the other hand, when the value of the present reception quality is smaller than the value higher by the raising amount β (Step E19; No), the control circuit 279d advances its processing to Step E27.

Then, at Step E23, the control circuit 279d changes the voltage level of the signal S3 to change the reception characteristic of the antenna 31 (Step E23). Then, the control circuit 279d makes the resister 2773 store the level "H" indicating that the change of the reception characteristic of the antenna 31 has been performed (Step E25). Moreover, at Step E27, the control circuit 279d makes the register 2773 store the level "L" indicating that no changes of the reception characteristic of the antenna 31 have been performed (Step E27).

After that, the control circuit 279d makes the register 2772 store the value of the present reception quality stored in the register 2770, and makes the register 2774 store the comparison result of the comparator 2761 (Step E29). Then, the control circuit 279d judges whether the antenna control is ended or not. When the antenna control is not ended (Step E31; No), the control circuit 279d returns its processing to Step E3. When the antenna control is ended (Step E31; Yes), the control circuit 279d ends the present processing.

Figure 17:
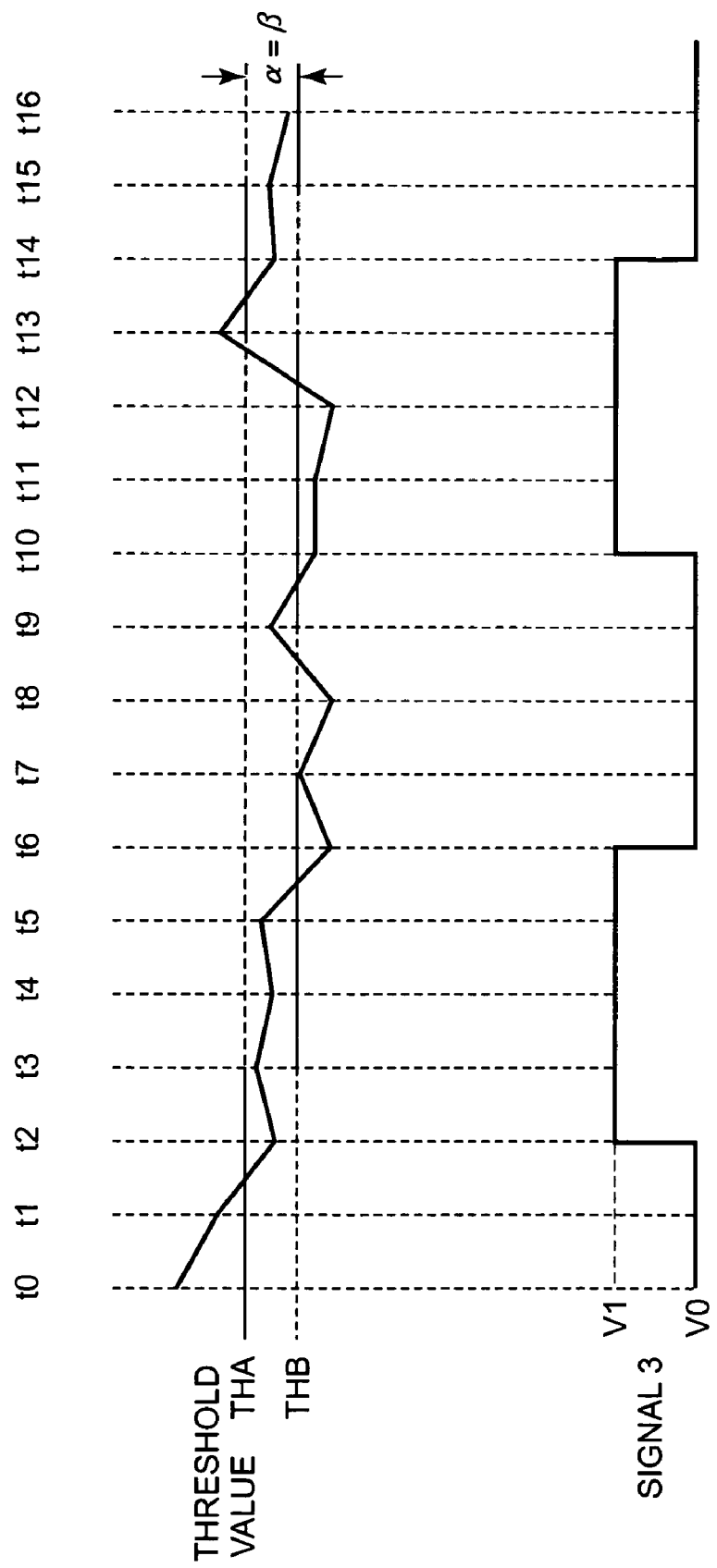
FIG. 17 is a diagram for illustrating the changes of the value of reception quality and the signal S3 of the fifth embodiment.
Figure 18:
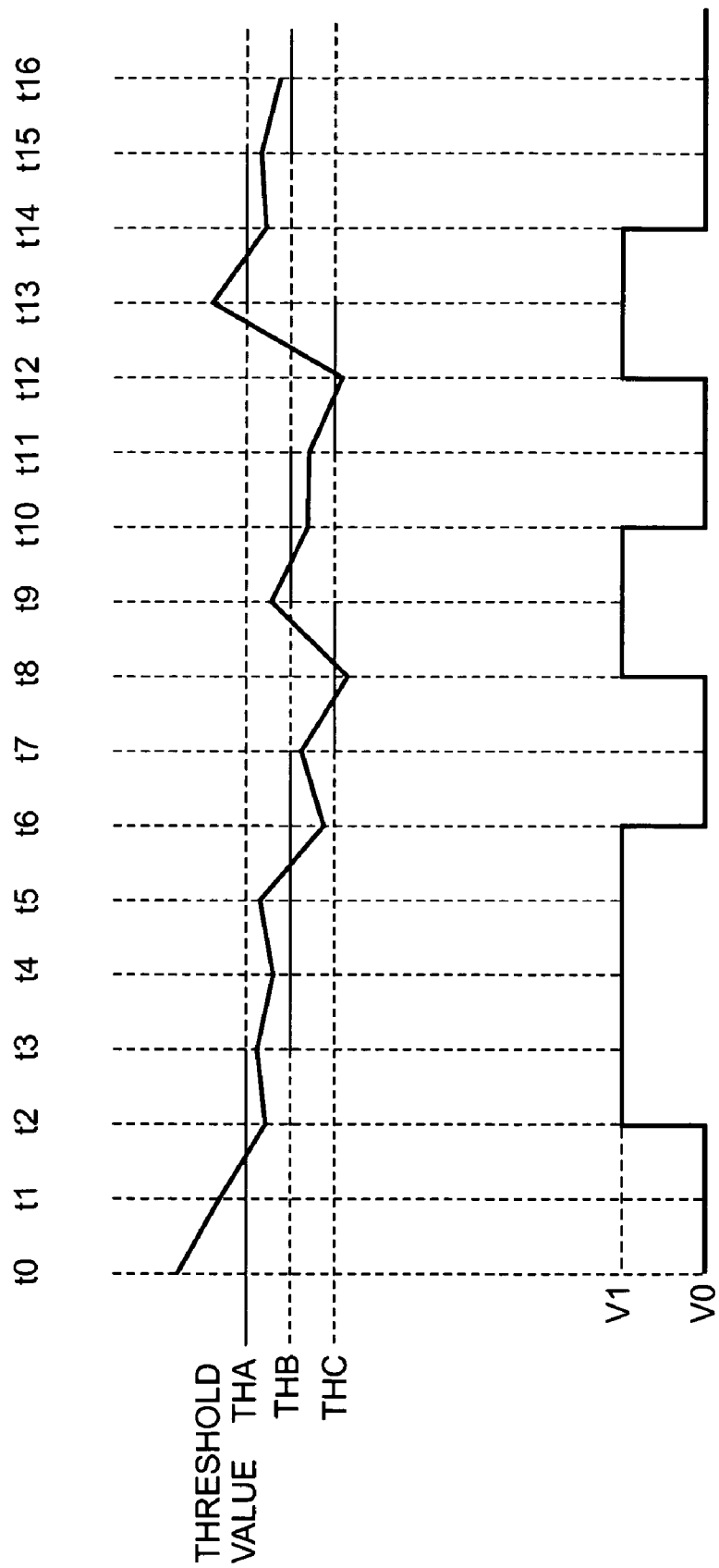
FIG. 18 is another diagram for illustrating the changes of the value of reception quality and the signal S3 of the fifth embodiment.

FIGS. 17 and 18 are diagrams showing examples of each signal waveform in the control circuit 279d. By setting their abscissa axes as times, FIGS. 17 and 18 severally show the values of the reception quality detected by the reception quality detection circuit 26 and the voltage levels of the signal S3 output from the antenna control circuit 27d in order from the top.

FIG. 17 shows the case where the maximum threshold value is set as "THA" and the minimum threshold value is set as "THB" and further both of the lowering amount α and the raising amount β of the threshold value are set as "THA−THB." Consequently, in case of FIG. 17, as the threshold values, "THA" and "THB" are set. That is, two steps of changes of the threshold value are performed. Provided that THA>THB.

According to FIG. 17, the threshold value is set as the "THA", which is the maximum threshold value, at a time t0. Then, the value of the reception quality is higher than the threshold value THA, and the voltage level of the signal S3 is V0.

At a time t1, although the value of the reception quality has fallen from the value of the last reception quality at the time t0, it is higher than the threshold value THA. Consequently, the voltage level of the signal S3 is not changed, but the voltage V0 is maintained. Then, no changes of the reception characteristic of the antenna 31 are performed.

At a time t2, because the value of the reception quality has fallen from the value of the last reception quality at the time t1 and has become lower than the threshold value THA, the voltage level of the signal S3 is changed from the voltage V0 to the voltage V1, and the change of the reception characteristic of the antenna 31 is performed.

At a time t3, although the value of the reception quality is higher than the value of the last reception quality at the time t2, it is lower than the threshold value THA. Consequently, the voltage level of the signal S3 is not changed, but the voltage V0 is maintained. Then, no changes of the reception characteristic of the antenna 31 are performed. Moreover, the threshold value is lowered from the "THA" by the lowering amount α to be the "THB."

At each of times t4 and t5, because the value of the reception quality is higher than the threshold value THB, the voltage level of the signal S3 is not changed, but the voltage V1 is maintained. Then, no changes of the reception characteristic of the antenna 31 are performed.

At a time t6, because the value of the reception quality has fallen from the value of the last reception quality at the time t5 and is lower than the threshold value THB, the voltage level of the signal S3 is changed from the voltage V1 to the voltage V0, and the change of the reception characteristic of the antenna 31 is performed.

At a time t7, although the value of the reception quality has become higher than the value of the last reception quality at the time t6 and has become lower than the threshold value THB, because the threshold value has been already the minimum threshold value THB, the threshold value cannot be lowered.

Then, the similar control is repeated also at each time t on and after. That is, at each of the times t8 and t9, no changes of the reception characteristic of the antenna 31 are performed, and the lowering or the raising of the threshold level is not also performed. Successively, at a time t10, because the value of the reception quality is lower than the value of the last reception quality at the time t9 and is lower than the threshold value THB, the voltage level of the signal S3 is changed from the voltage V0 to the voltage V1, and the change of the reception characteristic of the antenna 31 is performed.

At a time t11, although the value of the reception quality is almost equal to the value of the last reception quality at the time t10 and is lower than the threshold value THB, because the threshold value has been already the minimum threshold value THB, the threshold value cannot be lowered. Moreover, at a time t12, neither the change of the reception characteristic of the antenna 31 nor the lowering or the raising of the threshold value is performed.

Successively, at a time t13, the value of the reception quality is higher than the value of the last reception quality at the time t12, and is higher than the value higher than the threshold value THB by the raising amount β. Consequently, the threshold value is raised from "THB" by the raising amount β, and becomes "THA." Successively, at a time t14, the value of the reception quality has fallen from the value of the last reception quality at the time t13, and is lower than the threshold value THB. Consequently, the voltage level of the signal S3 is changed from the voltage V1 to the voltage V0, and the change of the reception characteristic of the antenna 31 is performed.

Then, at a time t15, because the value of the reception quality is higher than the value of the last reception quality at the time t14 and is lower than the threshold value THA, the threshold value is lowered from "THA" by the lowering amount α to be "THB."

Moreover, FIG. 18 shows the case of setting the maximum threshold value as "THA", the minimum threshold value as "THC", and both the lowering amount α and the raising amount β of the threshold value as "(THA−THB)/2", respectively. Consequently, in the case of FIG. 18, "THA", "THC" and "THB", which is an intermediate value of "THA" and "THC", are set as the threshold values. That is, three steps of changes of the threshold values are performed. Provided that THA>THB>THC.

According to FIG. 18, the threshold value is set as "THA", which is the maximum threshold value, at a time t0. Moreover, the value of the reception quality is higher than the threshold value THA, and the voltage level of the signal S3 is V0. At a time t1, because the value of the reception quality is higher than the threshold value THA, the change of the reception characteristic of the antenna 31, and the lowering or the raising of the threshold value are all not performed.

At a time t2, the value of the reception quality has fallen from the value of the last reception quality at the time t1, and it is lower than the threshold value THA. Consequently, the voltage level of the signal S3 is changed from the voltage V0 to the voltage V1, and the change of the reception characteristic of the antenna 31 is performed.

At a time t3, because the value of the reception quality is higher than the value of the last reception quality at the time t2 and is lower than the threshold value THA, the threshold value is lowered from "THA" to "THB" by one step.

At each of times t4 and t5, because the value of the reception quality is higher than the threshold value THB, any of the change of the reception characteristic of the antenna 31, and the raising or the lowering of the threshold value is not performed. At a time t6, because the value of the reception quality has fallen from the value of the last reception quality at the time t5 and is lower than the threshold value THB, the change of the reception characteristic of the antenna 31 is performed.

At a time t7, because the value of the reception quality is higher than the value of the last reception quality at the time t6 and is lower than the threshold value THB, the threshold value is lowered from "THB" to "THC" by one step. At a time t8, because the value of the reception quality has fallen from the value of the last reception quality at the time t7 and is lower than the threshold value THB, the change of the reception characteristic of the antenna 31 is performed.

At a time t9, the value of the reception quality is higher than the value of the reception quality at the time t8, and is higher than the threshold value THC. Moreover, the value of the reception quality is higher than the threshold value THB, which is higher than the present threshold value THC by one step. For this reason, the threshold value is raised from "THC" to "THB" by one step.

At a time t10, because the value of the reception quality has become lower than the value of the last reception quality at the time t9 and is lower than the threshold value THB, the change of the reception characteristic of the antenna 31 is performed. At a time t11, because the value of the reception quality is almost equal to the value of the last reception quality at the time t10 and is lower than the threshold value THB, the threshold value is lowered from "THB" to "THC" by one step. At a time t12, because the value of the reception quality has fallen from the value of the last reception quality at the time t11 and is lower than the threshold value THC, the change of the reception characteristic of the antenna 31 is performed.

At a time t13, the value of the reception quality is higher than the value of the last reception quality at the time t12, and is higher than the threshold value THC. Moreover, the value of the reception quality is higher than the threshold value THA, which is higher than the present threshold value THC by two steps. For this reason, the threshold value is raised from "THC" to "THA" by two steps.

At a time t14, the value of the reception quality has fallen from the value of the last reception quality at the time t13, and is lower than the threshold value THA. Consequently, the change of the reception characteristic of the antenna 31 is performed. At a time t15, because the value of the reception quality is higher than the value of the last reception quality at the time t14 and is lower than the threshold value THA, the threshold value is lowered from "THA" to "THB" by one step.

As described above, according to the fifth embodiment, the value of the reception quality of a received signal and the threshold values are compared, and the reception characteristic of the antenna 31 can be changed based on the comparison results. That is, when the value of the reception quality has become lower than a threshold value and has become worse than the value of the last reception quality, the threshold value is updated to a value lower than the present value. For this reason, even under an inferior reception environment, the unchanged state of the reception characteristic of the antenna 31 does not continue for a predetermined time or longer, and the more optimum reception quality can be secured.

MODIFIED EXAMPLE

Although the five embodiments have been described above, the range to which the receiving apparatus, the receiving method and the integrated circuit for a receiving apparatus of the present invention can be applied is not restricted to the thing for receiving the electric wave of digital broadcasting adopting the OFDM system. For example, with regard to any of a receiving apparatus, a receiving circuit and a receiving method which changes the reception characteristics of their receiving antenna according to the value of their reception quality, neither the analog/digital of a signal nor the modulation system thereof is restricted to those disclosed in the embodiments.

Figure 19:
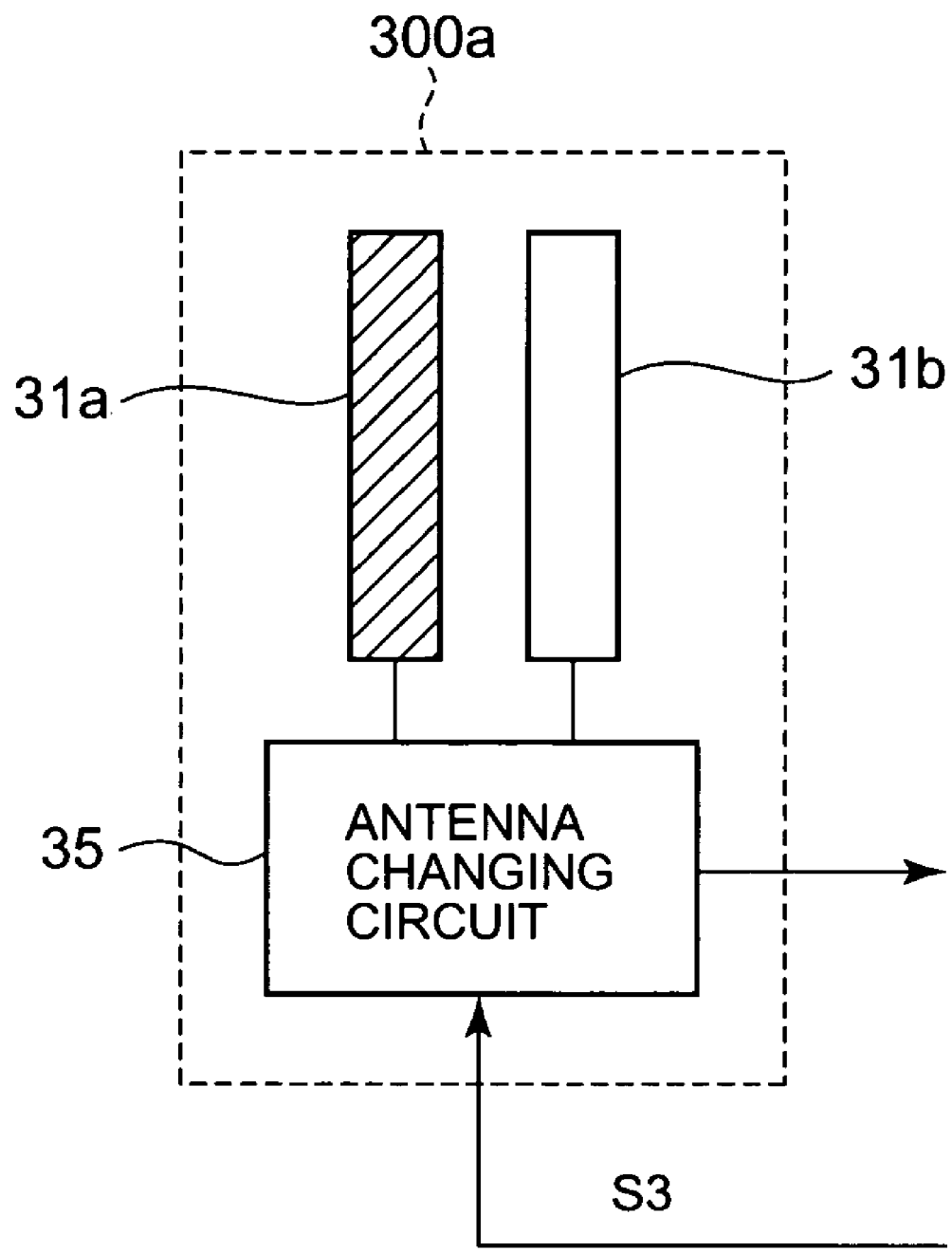
FIG. 19 is a diagram showing a modified example of a variable characteristic antenna unit.

Moreover, the variable characteristic antenna unit 300 may be configured to be provided with a plurality of receiving antennas. FIG. 19 is a diagram showing the configuration of a variable characteristic antenna unit 300a equipped with two receiving antennas. According to FIG. 19, the variable characteristic antenna unit 300a is composed of two antennas 31a and 31b and an antenna changing circuit 35.

The antennas 31a and 31b receive the electric wave of digital broadcasting, and output the received electric signal. Moreover, the antennas 31a and 31b are configured so that their reception characteristics such as the directivity may mutually differ.

The antenna changing circuit 35 selects any of the antennas 31a and 31b according to the voltage level of the signal S3 input from the antenna control circuit 27, and outputs the electric signal output from the selected antenna as the output signal from the variable characteristic antenna unit 300a. The reception characteristic of the variable characteristic antenna unit 300a is changed by the change of the antenna change circuit 35.

As described above, according to the invention, the value of the last reception quality of a received signal is compared with the value of the present reception quality, and the reception characteristic of a receiving antenna can be changed according to the comparison result. That is, when the reception quality of a received signal has worsened from the last reception quality, the reception characteristic of the receiving antenna is changed to change the reception state of the electric wave. Consequently, even if noises have occurred in the same band as a receiving band, the reception quality better than that at the last time can be secured.

Moreover, according to the invention, the value of the present reception quality of a received signal and a threshold value, and the value of the last reception quality and the value of the present reception quality can be compared, respectively, and the reception characteristic of a receiving antenna can be changed based on the comparison results. That is, when the reception quality of a received signal is worse than the threshold value and has worsened from the last reception quality, the reception characteristic of the receiving antenna is changed to change the reception state of an electric wave. Consequently, even if noises have occurred in the same band as a receiving band, the optimum reception quality can be secured.

Moreover, according to the invention, the value of the present reception quality of a received signal and a threshold value, the value of the last reception quality and the value of the present reception quality, and the value of the last reception quality and the threshold value are compared, respectively, and the reception characteristic of a receiving antenna can be changed based on the comparison results and whether the characteristic of the receiving antenna has been changed last time or not. That is, the reception characteristic of the receiving antenna is changed based on the comparison results mentioned above and whether the reception characteristic of the receiving antenna has been changed last time or not, and the reception state of an electric wave is changed. Consequently, even if noises have occurred in the same band as a receiving band, the optimum reception quality can be always secured.

Moreover, according to the invention, the value of the reception quality of a received signal and a threshold value are compared, and the reception characteristic of a receiving antenna can be changed based on the comparison result. That is, when a state of the value of the reception quality lower than the threshold value has continued for a predetermined time, the reception state of the electric wave is changed by changing the reception characteristic of the receiving antenna. Consequently, even if noises have occurred in the same band as a receiving band, it becomes always possible to secure the optimum reception quality. Moreover, because the unchanged state of the reception characteristic of the receiving antenna does not continue for a predetermined time or longer, it becomes possible to secure the more optimum reception quality.

Moreover, according to the invention, when the value of reception quality is higher than a threshold value, the threshold value can be changed to a value higher than the value of the present reception quality.

Moreover, according to the invention, when the value of reception quality is lower than a threshold value and has become worse than the value of the last reception quality, the threshold value is updated to a value lower than the present value. For this reason, even under an inferior reception environment, the unchanged sate of the reception characteristic of the receiving antenna does not continue for a predetermined time or longer, and it becomes possible to secure the more optimum reception quality.

Moreover, according to the invention, because the reception characteristic of a single receiving antenna is changed, it is unnecessary to arrange a plurality of antennas in a receiving apparatus to select a received signal of good reception quality or synthesize the received signals, and the miniaturization of the receiving apparatus can be achieved.

Furthermore, according to the invention, the reception characteristic of a receiving antenna can be changed by providing a plurality of receiving antennas to select any one of the plurality of receiving antennas.

What is claimed is:

1. A receiving apparatus comprising:
   a receiving antenna;
   a characteristic change unit for changing a reception characteristic of the receiving antenna;
   a reception quality detection unit for detecting a reception quality of a received signal received by the receiving antenna; and
   an antenna control unit for controlling the characteristic change unit to change the reception characteristic of the receiving antenna based on a detection result by the reception quality detection unit,
   wherein the antenna control unit includes:
      a comparison unit for comparing a value of a present reception quality detected by the reception quality detection unit with a value of a reception quality detected at a last time, and
      a change control unit for controlling the characteristic change unit to change the reception characteristic of the receiving antenna when it is judged that the value of the present reception quality has become worse than the value of the reception quality detected at the last time with the comparison unit, and
   wherein the characteristic change unit includes an auxiliary antenna arranged in a neighborhood of the receiving antenna, the auxiliary antenna changing the reception characteristic of the receiving antenna by receiving application of a voltage based on the control of the antenna control unit.

2. A receiving apparatus comprising:
   a receiving antenna;
   a characteristic change unit for changing a reception characteristic of the receiving antenna;
   a reception quality detection unit for detecting a reception quality of a received signal received by the receiving antenna; and
   an antenna control unit for controlling the characteristic change unit to change the reception characteristic of the receiving antenna based on a detection result by the reception quality detection unit,
   wherein the antenna control unit includes:
      a first comparison unit for comparing a value of the reception quality detected by the reception quality detection unit with a threshold value set in advance,
      a second comparison unit for comparing a value of a present reception quality detected by the reception quality detection unit with a value of a reception quality detected at a last time, and
      a change control unit for controlling the characteristic change unit to change the reception characteristic of the receiving antenna when it is judged that the value of the reception quality is worse than the threshold value with the first comparison unit and it is judged that the value of the present reception quality has become worse than the value of the reception quality detected at the last time with the second comparison unit.

3. The receiving apparatus according to claim 2, wherein the characteristic change unit includes an auxiliary antenna arranged in a neighborhood of the receiving antenna, the auxiliary antenna changing the reception characteristic of the receiving antenna by receiving application of a voltage based on the control of the antenna control unit.

4. The receiving apparatus according to claim 2, comprising a plurality of receiving antennas, wherein the characteristic change unit selects any one of the plurality of receiving antennas based on the control of the antenna control unit.

5. A receiving apparatus, comprising:
a receiving antenna;
a characteristic change unit for changing a reception characteristic of the receiving antenna;
a reception quality detection unit for detecting a reception quality of a received signal received by the receiving antenna; and
an antenna control unit for controlling the characteristic change unit to change the reception characteristic of the receiving antenna based on a detection result by the reception quality detection unit,
wherein the antenna control unit includes:
a first comparison unit for comparing a value of the reception quality detected by the reception quality detection unit with a threshold value set in advance,
a second comparison unit for comparing a value of a present reception quality detected by the reception quality detection unit with a value of a reception quality detected at a last time,
a third comparison unit for comparing the value of the last reception quality detected by the reception quality detection unit with the threshold value, and
a change control unit for controlling the characteristic change unit to change the reception characteristic of the receiving antenna when it is judged that the value of the reception quality is worse than the threshold value with the first comparison unit and it is judged that the value of the present reception quality has become worse than the value of the reception quality detected at the last time with the second comparison unit and it is judged that the value of the reception quality at the last time is better than the threshold value by the third comparison unit, or when it is judged that the value of the reception quality is worse than the threshold value with the first comparison unit and it is judged that the value of the present reception quality has become worse than the value of the reception quality detected at the last time with the second comparison unit and it is judged that the value of the reception quality at the last time is worse than the threshold value by the third comparison unit and the reception characteristic of the receiving antenna was changed at the last time.

6. The receiving apparatus according to claim 5, wherein the characteristic change unit includes an auxiliary antenna arranged in a neighborhood of the receiving antenna, the auxiliary antenna changing the reception characteristic of the receiving antenna by receiving application of a voltage based on the control of the antenna control unit.

7. The receiving apparatus according to claim 5, comprising a plurality of receiving antennas, wherein the characteristic change unit selects any one of the plurality of receiving antennas based on the control of the antenna control unit.

8. A receiving apparatus, comprising:
a receiving antenna;
a characteristic change unit for changing a reception characteristic of the receiving antenna;
a reception quality detection unit for detecting a reception quality of a received signal received by the receiving antenna;
an antenna control unit for controlling the characteristic change unit to change the reception characteristic of the receiving antenna based on a detection result by the reception quality detection unit;
a register unit for storing a predetermined threshold value; and
a comparison unit for comparing a value of the reception quality detected by the reception quality detection unit with the threshold value stored in the register unit,
wherein the antenna control unit includes a change control unit for controlling the characteristic change unit to change the reception characteristic of the receiving antenna when the antenna control unit judges that a state in which the value of the reception quality detected by the reception quality detection unit is lower than the threshold value stored in the register unit has continued for a predetermined time based on a comparison result by the comparison unit.

9. The receiving apparatus according to claim 8, wherein the antenna control unit includes a register value change control unit for controlling the register unit to change the threshold value stored in the register unit to a value higher than the value stored now when the antenna control unit judges that the value of the reception quality detected by the reception quality detection unit is higher than the threshold value stored in the register unit based on the comparison result of the comparison unit.

10. The receiving apparatus according to claim 8, further comprising:
a second register unit for storing a value of a last reception quality; and
a second comparison unit for comparing the value of the last reception quality stored in the second register unit with the value of the reception quality detected by the reception quality detection unit,
wherein the antenna control unit includes a register value change control unit for controlling the register unit to change the threshold value stored in the register unit to a value lower than the value stored now when the antenna control unit judges that the value of the reception quality detected by the reception quality detection unit is lower than the threshold value stored in the register unit based on the comparison result of the comparison unit and that the value of the reception quality detected by the reception quality detection unit has become worse than the value of the last reception quality based on a comparison result of the second comparison unit.

11. The receiving apparatus according to claim 8, wherein the characteristic change unit includes an auxiliary antenna arranged in a neighborhood of the receiving antenna, the auxiliary antenna changing the reception characteristic of the receiving antenna by receiving application of a voltage based on the control of the antenna control unit.

12. The receiving apparatus according to claim 8, comprising a plurality of receiving antennas, wherein the characteristic change unit selects any one of the plurality of receiving antennas based on the control of the antenna control unit.

13. A receiving circuit, comprising:
a characteristic change circuit which changes a reception characteristic of a receiving antenna;

a reception quality detection circuit which detects a reception quality of a received signal received by the receiving antenna; and
an antenna control circuit which controls the characteristic change circuit to change the reception characteristic of the receiving antenna based on a detection result by the reception quality detection circuit,
wherein the antenna control circuit includes:
a comparison circuit which compares a value of a present reception quality detected by the reception quality detection circuit with a value of a reception quality detected at a last time; and
a change control circuit which controls the characteristic change circuit to change the reception characteristic of the receiving antenna when it is judged that the value of the present reception quality has become worse than the value of the reception quality detected at the last time, and
wherein the characteristic change circuit includes an auxiliary antenna arranged in a neighborhood of the receiving antenna, the auxiliary antenna changing the reception characteristic of the receiving antenna by receiving application of a voltage based on the control of the antenna control circuit.

14. A receiving circuit, comprising:
a characteristic change circuit which changes a reception characteristic of a receiving antenna;
a reception quality detection circuit which detects a reception quality of a received signal received by the receiving antenna; and
an antenna control circuit which controls the characteristic change circuit to change the reception characteristic of the receiving antenna based on a detection result by the reception quality detection circuit,
wherein the antenna control circuit includes:
a first comparison circuit which compares a value of the reception quality detected by the reception quality detection circuit with a threshold value set in advance,
a second comparison circuit which compares a value of a present reception quality detected by the reception quality detection circuit with a value of a reception quality detected at a last time, and
a change control circuit which controls the characteristic change circuit to change the reception characteristic of the receiving antenna when it is judged that the value of the reception quality is worse than the threshold value with the first comparison circuit and it is judged that the value of the present reception quality has become worse than the value of the reception quality detected at the last time with the second comparison circuit.

15. The receiving circuit according to claim 14, wherein the characteristic change circuit includes an auxiliary antenna arranged in a neighborhood of the receiving antenna, the auxiliary antenna changing the reception characteristic of the receiving antenna by receiving application of a voltage based on the control of the antenna control circuit.

16. The receiving circuit according to claim 14, comprising a plurality of receiving antennas, wherein the characteristic change circuit selects any one of the plurality of receiving antennas based on the control of the antenna control circuit.

17. A receiving circuit, comprising:
a characteristic change circuit which changes a reception characteristic of a receiving antenna;
a reception quality detection circuit which detects a reception quality of a received signal received by the receiving antenna; and
an antenna control circuit which controls the characteristic change circuit to change the reception characteristic of the receiving antenna based on a detection result by the reception quality detection circuit,
wherein the antenna control circuit includes:
a first comparison circuit which compares a value of the reception quality detected by the reception quality detection circuit with a threshold value set in advance,
a second comparison circuit which compares a value of a present reception quality detected by the reception quality detection circuit with a value of a reception quality detected at a last time,
a third comparison circuit which compares the value of the last reception quality detected by the reception quality detection circuit with the threshold value, and
a change control circuit which controls the characteristic change circuit to change the reception characteristic of the receiving antenna when it is judged that the value of the reception quality is worse than the threshold value with the first comparison circuit and it is judged that the value of the present reception quality has become worse than the value of the reception quality detected at the last time with the second comparison circuit and it is judged that the value of the reception quality at the last time is better than the threshold value by the third comparison circuit, or when it is judged that the value of the reception quality is worse than the threshold value with the first comparison circuit and it is judged that the value of the present reception quality has become worse than the value of the reception quality detected at the last time with the second comparison circuit and it is judged that the value of the reception quality at the last time is worse than the threshold value by the third comparison circuit and the reception characteristic of the receiving antenna was changed at the last time.

18. The receiving circuit according to claim 17, wherein the characteristic change circuit includes an auxiliary antenna arranged in a neighborhood of the receiving antenna, the auxiliary antenna changing the reception characteristic of the receiving antenna by receiving application of a voltage based on the control of the antenna control circuit.

19. The receiving circuit according to claim 17, comprising a plurality of receiving antennas, wherein the characteristic change circuit selects any one of the plurality of receiving antennas based on the control of the antenna control circuit.

20. A receiving circuit, comprising:
a characteristic change circuit which changes a reception characteristic of a receiving antenna;
a reception quality detection circuit which detects a reception quality of a received signal received by the receiving antenna;
an antenna control circuit which controls the characteristic change circuit to change the reception characteristic of the receiving antenna based on a detection result by the reception quality detection circuit;
a register circuit which stores a predetermined threshold value; and
a comparison circuit which compares a value of the reception quality detected by the reception quality detection circuit with the threshold value stored in the register circuit,
wherein the antenna control circuit includes a change control circuit for controlling the characteristic change circuit to change the reception characteristic of the receiving antenna when the antenna control circuit judges that a state in which the value of the reception quality detected by the reception quality detection circuit is lower than the threshold value stored in the register circuit has continued for a predetermined time based on a comparison result by the comparison circuit.

21. The receiving circuit according to claim 20, wherein the antenna control circuit includes a register value change control circuit which controls the register circuit to change the threshold value stored in the register circuit to a value higher than the value stored now when the antenna control circuit judges that the value of the reception quality detected by the reception quality detection circuit is higher than the threshold value stored in the register circuit based on the comparison result of the comparison circuit.

22. The receiving circuit according to claim 20, further comprising:
   a second register circuit which stores a value of a last reception quality; and
   a second comparison circuit which compares the value of the last reception quality stored in the second register circuit with the value of the reception quality detected by the reception quality detection circuit,
   wherein the antenna control circuit includes a register value change control circuit which controls the register circuit to change the threshold value stored in the register circuit to a value lower than the value stored now when the antenna control circuit judges that the value of the reception quality detected by the reception quality detection circuit is lower than the threshold value stored in the register circuit based on the comparison result of the comparison circuit and that the value of the reception quality detected by the reception quality detection circuit has become worse than the value of the last reception quality based on a comparison result of the second comparison circuit.

23. The receiving circuit according to claim 20, wherein the characteristic change circuit includes an auxiliary antenna arranged in a neighborhood of the receiving antenna, the auxiliary antenna changing the reception characteristic of the receiving antenna by receiving application of a voltage based on the control of the antenna control circuit.

24. The receiving circuit according to claim 20, comprising a plurality of receiving antennas, wherein the characteristic change circuit selects any one of the plurality of receiving antennas based on the control of the antenna control circuit.

* * * * *